United States Patent
Nakao et al.

(10) Patent No.: US 10,439,778 B2
(45) Date of Patent: *Oct. 8, 2019

(54) MOBILE STATION AND RECEPTION METHOD

(71) Applicant: Sun Patent Trust, New York, NY (US)

(72) Inventors: Seigo Nakao, Osaka (JP); Masayuki Hoshino, Kanagawa (JP); Atsushi Sumasu, Fukuoka (JP); Katsuhiko Hiramatsu, Osaka (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/225,375

(22) Filed: Dec. 19, 2018

(65) Prior Publication Data
US 2019/0123873 A1    Apr. 25, 2019

Related U.S. Application Data

(63) Continuation of application No. 15/953,984, filed on Apr. 16, 2018, now Pat. No. 10,211,959, which is a
(Continued)

(30) Foreign Application Priority Data

Aug. 17, 2007  (JP) ................................ 2007-213077
Jun. 23, 2008  (JP) ................................ 2008-163032

(51) Int. Cl.
*H04L 7/033*      (2006.01)
*H04L 5/00*       (2006.01)
(Continued)

(52) U.S. Cl.
CPC ......... *H04L 5/0048* (2013.01); *H04B 7/0413* (2013.01); *H04B 7/0417* (2013.01);
(Continued)

(58) Field of Classification Search
CPC .. H04B 7/0417; H04B 7/0682; H04B 7/0413; H04W 74/002; H04W 88/08;
(Continued)

(56) References Cited

U.S. PATENT DOCUMENTS 8,542,770 B2    9/2013  Nakao et al.
2006/0182192 A1  8/2006  Takano
(Continued)

FOREIGN PATENT DOCUMENTS

WO       02/17512 A1      2/2002
WO    2007/049760 A1      5/2007

OTHER PUBLICATIONS

"3rd Generation Partnership Project; Technical Specification Group Radio Access Network; Physical layer aspects for evolved Universal Terrestrial Radio Access (UTRA) (Release 7)," Technical Report, 3GPP TR 25.814 V7.1.0, Sep. 2006, 132 pages.
(Continued)

*Primary Examiner* — Juan A Torres
(74) *Attorney, Agent, or Firm* — Seed IP Law Group LLP

(57) ABSTRACT

Provided is a radio communication device which can separate propagation paths of antenna ports and improve a channel estimation accuracy even when using virtual antennas. The device includes: a mapping unit which maps a data signal after modulation to a virtual antenna and a virtual antenna; a phase inversion unit which inverts the phase of S0 transmitted from an antenna port in synchronization with a phase inversion unit between the odd-number slot and the even-number slot; the phase inversion unit which inverts the phase of R0 transmitted from the antenna port; a phase inversion unit which inverts the phase of S1 transmitted from an antenna port in synchronization with a phase inversion unit; and the phase inversion unit which inverts the phase of R1 transmitted from an antenna port.

17 Claims, 17 Drawing Sheets

Related U.S. Application Data continuation of application No. 15/478,704, filed on Apr. 4, 2017, now Pat. No. 9,979,523, which is a continuation of application No. 15/218,877, filed on Jul. 25, 2016, now Pat. No. 9,654,190, which is a continuation of application No. 14/830,527, filed on Aug. 19, 2015, now Pat. No. 9,438,322, which is a continuation of application No. 13/972,586, filed on Aug. 21, 2013, now Pat. No. 9,148,268, which is a continuation of application No. 12/673,560, filed as application No. PCT/JP2008/002221 on Aug. 15, 2008, now Pat. No. 8,542,770.

(51) Int. Cl.

| | |
|---|---|
| H04B 7/0413 | (2017.01) |
| H04B 7/06 | (2006.01) |
| H04L 27/26 | (2006.01) |
| H04B 7/0417 | (2017.01) |
| H04W 74/00 | (2009.01) |
| H04L 25/02 | (2006.01) |
| H04W 88/02 | (2009.01) |
| H04W 88/08 | (2009.01) |

(52) U.S. Cl.
CPC ......... *H04B 7/0682* (2013.01); *H04L 5/0023* (2013.01); *H04L 25/0226* (2013.01); *H04L 25/0228* (2013.01); *H04L 27/2613* (2013.01); *H04L 27/2626* (2013.01); *H04W 74/002* (2013.01); *H04W 88/02* (2013.01); *H04W 88/08* (2013.01)

(58) Field of Classification Search
CPC ............... H04W 88/02; H04L 27/2626; H04L 27/2613; H04L 5/0048; H04L 5/0023; H04L 25/0226; H04L 25/0228
USPC ........................................................ 375/299
See application file for complete search history.

(56) References Cited

U.S. PATENT DOCUMENTS

| | | |
|---|---|---|
| 2008/0260062 A1 | 10/2008 | Imamura |
| 2008/0304593 A1 | 12/2008 | Khan et al. |
| 2009/0238290 A1 | 9/2009 | Imai et al. |

OTHER PUBLICATIONS

"3rd Generation Partnership Project; Technical Specification Group Radio Access Network; Physical Channels and Modulation (Release 8)," Technical Specification, 3GPP TS 36.211 V1.1.0, May 2007, 34 pages.

"3rd Generation Partnership Project; Technical Specification Group Radio Access Network; Physical layer procedures (Release 8);" Technical Specification, 3GPP TS 36.213 V1.2.0, May 2007, 10 pages.

Catt, Ritt, "Views on the High Level Principles of MIMO for unicast traffic in E-UTRA downlink," R1-060521, Agenda Item: 13.1.2, 3GPP TSG RAN WG1 Meeting #44, Denver, USA, Feb. 13-17, 2006, 8 pages.

Ericsson, Motorola, NTT DoCoMo, "Text Proposal for Downlink Pilot Design for EUTRA," R1-051327, Agenda Item: 8.2, 3GPP TSG RAN1#42bis, Seoul, Korea, Nov. 7-11, 2005, 4 pages.

Ericsson, NTT DoCoMo, "E-UTRA downlink reference signal structure," R1-051187, Agenda Item: 8.7, TSG-RAN WG1 #42bis, San Diego, US, Oct. 9-14, 2005, 4 pages.

Extended European Search Report, dated Aug. 14, 2012, for corresponding European Application No. 08827883.3-1246 / 2180603, 11 pages.

Extended European Search Report, dated Jul. 24, 2013, for corresponding European Application No. 13173844.5-1855, 8 pages.

International Search Report, dated Nov. 18, 2008, for corresponding International Application No. PCT/JP2008/002221, 1 page.

Ko, "Potential Technologies for LTE-Advanced," Electronics and Telecommunications Research Institute, Next Generation Mobile Communication Research Team, Jun. 11, 2008, 19 pages.

NTT DoCoMo, Fujitsu, Institute for Infocomm Research, KDDI, Mitsubishi Electric, NEC, Panasonic, Toshiba Corporation, "Transmit Diversity Scheme for Control Channel in E-UTRA Downlink," R1-072423, Agenda Item: 7.10.3, 3GPP TSG RAN WG1 Meetig #49, Kobe, Japan, May 7-11, 2007, 5 pages.

Qualcomm Europe, "Description of Single and Multi Codeword Schemes with Precoding," R1-060457, Agenda Item: 13.1.2, 3GPP TSG-RAN WG1 #44, Denver, USA, Feb. 13-17, 2006, 9 pages.

Samsung, "Reference signal structure for 4-TX antenna MIMO," R1-063254, Agenda Item: 6.4.1, 3GPP TSG RAN WG1 Meeting #47, Riga, Latvia, Nov. 6-10, 2006, 8 pages.

Samsung, "Future 3GPP Radio Technologies for IMT-Advanced," REV-080037, Agenda Item: 3, 3GPP IMT-Advanced Workshop, Shenzhen, China, Apr. 7-8, 2008, 20 pages.

Texas Instruments, "Performance of RS Structures with 4 Tx Antennas in E-UTRA Downlink," R1-063227, Agenda Item: 6.4.1, 3GPP TSG RAN WG1#47, Riga, Latvia, Nov. 6-10, 2006, 12 pages.

MOBILE STATION AND RECEPTION METHOD

CROSS-REFERENCE(S) TO RELATED APPLICATION(S)

The present application claims priority under 35 U.S.C. 119(e) of Japanese Patent Application No. 2007-213077, filed on Aug. 17, 2007, and Japanese Patent Application No. 2008-163032, filed on Jun. 23, 2008, the disclosures of which are incorporated herein by reference including the specifications, drawings and abstracts in their entirety.

BACKGROUND

Technical Field

The present invention relates to a radio communication apparatus and a radio communication method.

Background Art

3GPP-LTE adopts OFDMA (Orthogonal Frequency Division Multiple Access) as a downlink communication scheme. According to 3GPP-LTE, a radio communication base station apparatus (hereinafter abbreviated as a "base station") transmits a reference signal ("RS") using predetermined communication resources and a radio communication terminal apparatus (hereinafter abbreviated as a "terminal") performs channel estimation using the received reference signal and demodulates data (see Non-Patent Document 1).

Furthermore, when the base station is provided with a plurality of antenna ports, the base station can carry out diversity transmission. On the other hand, in order for a terminal to receive a diversity-transmitted signal without errors, the terminal needs to know the conditions of the propagation path from the antenna port group used in the base station to the terminal. Therefore, RSs need to be transmitted from all antenna ports provided in the base station without mutual interference. To realize this, 3GPP-LTE adopts a method of transmitting RSs using different timings and carrier frequencies in the time domain and the frequency domain from individual antenna ports in the base station.

FIG. 1A illustrates a configuration of a base station having two antenna ports (2-Tx base station) assumed in 3GPP-LTE and FIG. 1B illustrates an RS transmission method by a 2-Tx base station. Likewise, FIG. 2A illustrates a configuration of a base station having four antenna ports (a 4-Tx base station) assumed in 3GPP-LTE and FIG. 2B illustrates an RS transmission method by a 4-Tx base station. In FIGS. 1B and 2B, the vertical axis (frequency domain) shows subcarrier units and the horizontal axis (time domain) shows Orthogonal Frequency Division Multiplexing (OFDM) symbol units. Furthermore, one slot is made up of seven OFDM symbols. Furthermore, R0, R1, R2 and R3 indicate The RSs transmitted from antenna ports 0, 1, 2 and 3 (the first, second, third and fourth antenna ports). Furthermore, a unit of one block enclosed by a frame of a bold line (12 subcarriers in the frequency domain, seven OFDM symbols in the time domain) will be referred to as a "resource block ("RB")." As is clear from FIGS. 1B and 2B, the 4-Tx base station reduces the frequency of RS transmission from antenna port 2 (third antenna port) and antenna port 3 (fourth antenna port) to minimize the overhead on RS transmission.

By the way, a 1-Tx base station transmits RS using the only resources of R0 in the RS arrangement by the 2-Tx base station.

As described above, the 4-Tx base station has a low transmission frequency of RSs from antenna port 2 and antenna port 3. Therefore, a terminal that receives RSs from the 4-Tx base station cannot interpolate the channel estimate values of antenna port 2 and antenna port 3 in one RB, and, consequently, the accuracy of channel estimation is deteriorated severely during high-speed movement. Therefore, it has been confirmed that avoiding the use of antenna port 2 and antenna port 3 of the base station during high-speed movement of the terminal can improve the SNR performance at the terminal (see Non-Patent Document 2).

Therefore, although a 4-Tx base station has been conventionally provided with four antenna ports, only two antenna ports are used when a terminal is moving at high speed.

Alternatively, in order to use four radio transmitting sections of a 4-Tx base station effectively, as shown in FIG. 3, conventionally, a 4-Tx base station is conventionally handled as a virtual 2-Tx base station provided with virtual antenna 0 made up of antenna port 0 and antenna port 2 and virtual antenna 1 made up of antenna port 1 and antenna port 3. However, in FIG. 3, a CDD (Cyclic Delay Diversity) generation section is added to antenna port 2 and antenna port 3 to suppress unnecessary beam forming effect caused by virtual antennas.

In this case, assuming that a signal outputted from the mapping section in FIG. 3 is:

$$S_{2Tx} = \begin{pmatrix} S_0 \\ S_1 \end{pmatrix} \quad [1]$$

the signal $y_{virtual}$ transmitted from the four antenna ports is represented by:

$$y_{virtual} = D \begin{pmatrix} 10 \\ 01 \\ 10 \\ 01 \end{pmatrix} S_{2Tx} \quad [2]$$

where D is a 4×4 diagonal matrix representing CDD.

Non-Patent Document 1: 3GPP TS 36.211 V1.1.0, R1-072633.

Non-Patent Document 2: Transmit Diversity Scheme for Control Channel in E-UTRA, R1-072423.

BRIEF SUMMARY

Problems to be Solved by the Invention

However, when virtual antennas such as the ones described above are used, since a base station transmits the same RS from two antenna ports, a terminal cannot separate between the propagation paths of four antenna ports in the base station. For this reason, the terminal cannot know the conditions of the propagation paths between individual antenna ports and the terminal. Therefore, it is no longer possible to optimize space division multiplexing ("SDM"), which is made possible when the base station controls the transmission weights for the four antenna ports individually. This problem has a significant impact on a terminal moving at low speed (hereinafter abbreviated as a "low-speed terminal").

Furthermore, the terminal cannot know the number of antenna ports at a base station until a BCH (Broadcast CHannel) signal is received from that base station. According to 3GPP-LTE, since a 1-Tx base station is also present, a terminal, not knowing the number of antenna ports at a base station, cannot help but perform channel estimation using only R0 that is sure to be transmitted. Therefore, when a base station having a plurality of antenna ports transmits a BCH signal using antenna ports other than antenna port 0, the transmission method of the base station and the reception method of a terminal do not match. Therefore, when a base station having a plurality of antenna ports transmits a BCH signal using only antenna port 0, the base station cannot perform diversity transmission of the BCH signal despite having a plurality of antenna ports. Therefore, the coverage of a BCH signal is smaller than the coverage of a data signal capable of diversity transmission.

It is therefore an object of the present invention to provide a radio communication apparatus and a radio communication method capable of separating between the propagation paths of a plurality of antenna ports and improving the accuracy of channel estimation even when using virtual antennas.

Means for Solving the Problem

The radio communication apparatus according to the present invention adopts a configuration including a virtual antenna formed with a plurality of antenna ports and an inversion section that inverts a sign of one of reference signals transmitted from the plurality of antenna ports respectively.

The radio communication method according to the present invention is a radio communication method for a radio communication apparatus having a virtual antenna formed with a plurality of antenna ports, the method inverting a sign of one of reference signals transmitted from the plurality of antenna ports respectively.

Advantageous Effects of Invention

According to the present invention, it is possible to separate propagation paths of a plurality of antenna ports and improve channel estimation accuracy even when using virtual antennas.

DETAILED DESCRIPTION

Figure 1A:
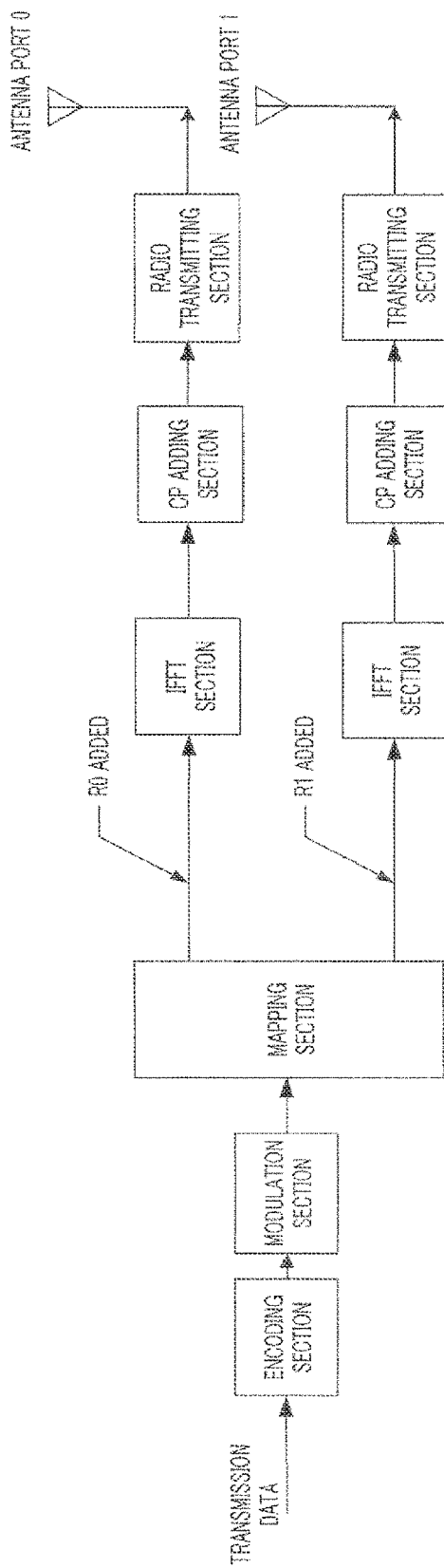
FIG. 1A is a block diagram illustrating a configuration of a conventional 2-Tx base station.
Figure 1B:
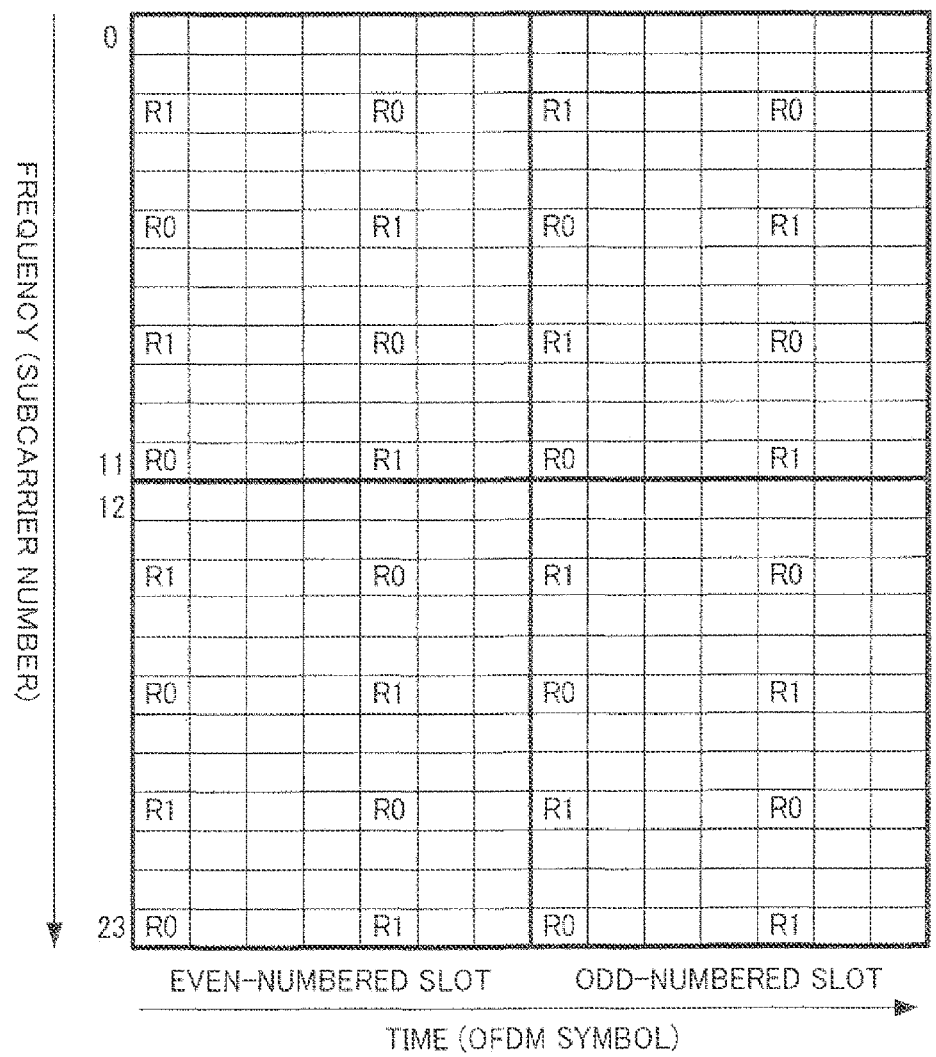
FIG. 1B illustrates an RS transmission method in the conventional 2-Tx base station.

Hereinafter embodiments of the present invention will be described in detail with reference to the accompanying drawings.

Embodiment 1

With the present embodiment, a 4-Tx base station transmits RSs and data signals using two virtual antennas formed with two antenna ports each (virtual antenna transmission). However, the sign of a signal transmitted from one of the antenna ports forming one virtual antenna is inverted per RB in the time domain.

The base station uses virtual antennas in this way and therefore can optimize transmission quality of a signal directed to a terminal which is moving at high speed (hereinafter abbreviated as a "high-speed terminal") while using four antenna ports effectively. Furthermore, the terminal can separate RSs from the two virtual antennas into RSs from the four antenna ports, which allows the terminal to perform channel estimation for all antenna ports.

Furthermore, with the present embodiment, the base station transmits a data signal to a terminal suitable for transmission of data signals using the four antenna ports, a low-speed terminal in particular, using the four antenna ports without using virtual antennas (antenna port transmission). However, for antenna port 2 and antenna port 3, it is preferable to transmit data signals via a CDD generation section added at the time of formation of the virtual antenna.

This allows a terminal desiring virtual antenna transmission to be present with a terminal desiring antenna port transmission within a cell covered by a base station.

Furthermore, according to the present embodiment, a base station may also transmit RSs and data signals while inverting the signs of virtual antennas in the frequency domain, not in the time domain.

This allows the terminal to average the channel estimate values obtained from RSs in the time domain (before separation), so that it is possible to improve the accuracy of channel estimation at the terminal.

Furthermore, according to the present embodiment, a 4-Tx base station continues virtual antenna transmission as a virtual 2-Tx base station unless requested otherwise from a terminal. That is, a 4-Tx base station switches virtual antenna transmission to antenna port transmission according to request from a terminal. In this way, the present embodiment assumes virtual antenna transmission as the basic transmission method of the base station. This makes it possible to provide a base station compliant with 3GPP-LTE.

Hereinafter base station 100 according to the present embodiment will be described in detail. However, a 2-Tx base station exists in the vicinity of base station 100 at such a distance that no interference occurs between cells. Since a terminal can move between the cell of base station 100 and the cell of the 2-Tx base station, the terminal needs to be able to communicate with one of the base stations seamlessly.

Furthermore, base station 100 normally operates as a virtual 2-Tx base station that carries out virtual antenna transmission and operates as a 4-Tx base station that carries out antenna port transmission for a terminal that requests antenna port transmission.

Figure 4:
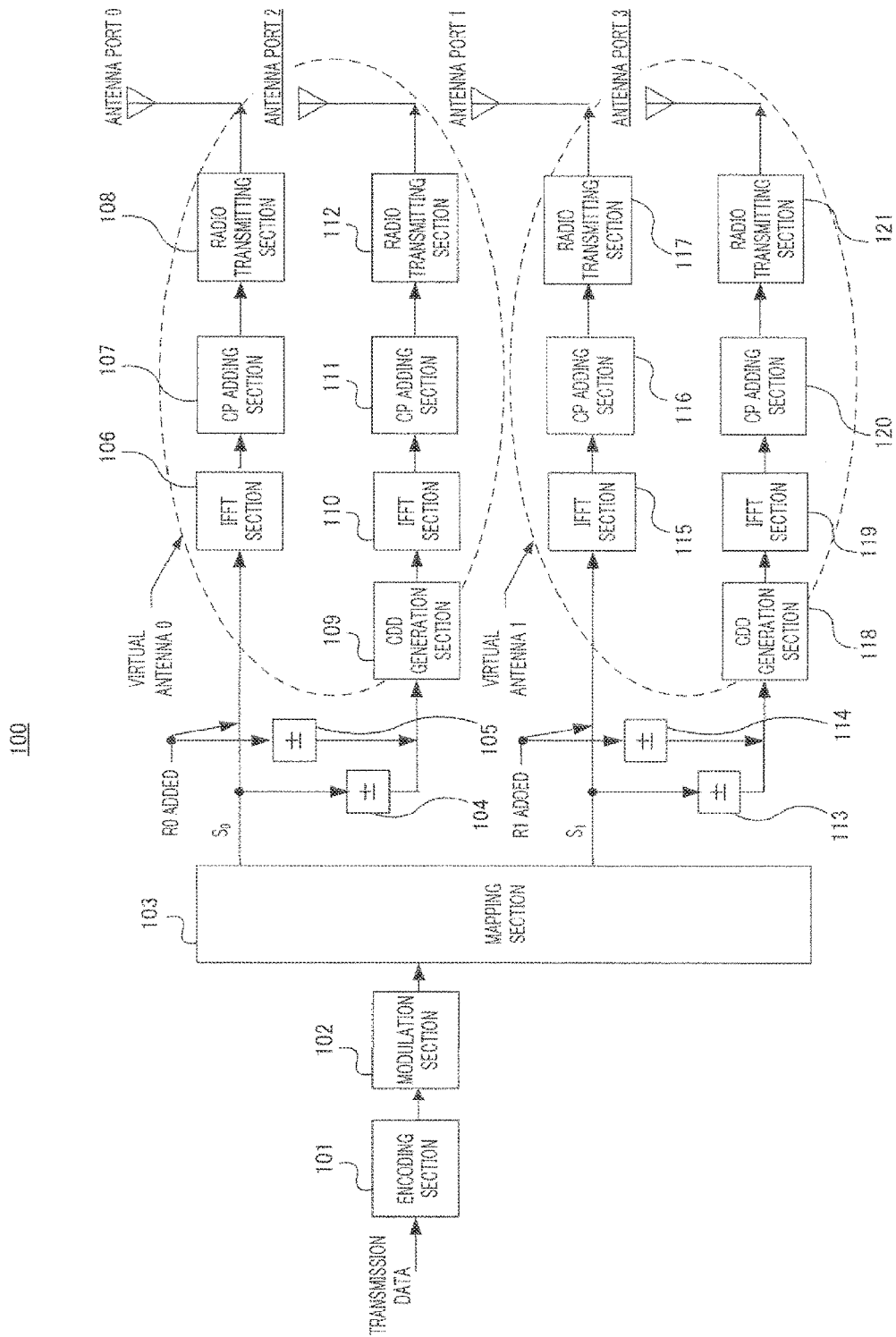
FIG. 4 is a block diagram illustrating a configuration of a base station according to Embodiment 1 of the present invention (when operating as a virtual 2-Tx base station that carries out virtual antenna transmission)

FIG. 4 illustrates a configuration of base station 100 that operates as a virtual 2-Tx base station that carries out virtual antenna transmission.

In base station 100 shown in FIG. 4, encoding section 101 encodes transmission data.

Modulation section 102 modulates the encoded data.

Mapping section 103 maps modulated data signals to virtual antenna 0 and virtual antenna 1 respectively. The data signal mapped to virtual antenna 0 is $S_0$ and the data signal mapped to virtual antenna 1 is $S_1$. Furthermore, the RS transmitted from virtual antenna 0 is R0 and the RS transmitted from virtual antenna 1 is R1.

Inversion section 104 inverts the sign of $S_0$ transmitted from antenna port 2 between odd-numbered slots and even-numbered slots in synchronization with inversion section 105.

Inversion section 105 inverts the sign of R0 transmitted from antenna port 2 between odd-numbered slots and even-numbered slots in synchronization with inversion section 104.

IFFT (Inverse Fast Fourier Transform) section 106 performs an IFFT on $S_0$ and R0 to generate an OFDM symbol.

CP (Cyclic Prefix) adding section 107 adds the same signal as that of the tail part of the OFDM symbol to the beginning of that OFDM symbol as a CP.

Radio transmitting section 108 performs transmission processing such as D/A conversion, amplification and up-conversion on the OFDM symbol with a CP and transmits the OFDM symbol from antenna port 0.

CDD generation section 109 generates CDD for $S_0$ and R0.

IFFT section 110 performs an IFFT on $S_0$ and R0 to generate an OFDM symbol.

CP adding section 111 adds the same signal as that of the tail part of the OFDM symbol to the beginning of that OFDM symbol as a CP.

Radio transmitting section 112 performs transmission processing such as D/A conversion, amplification and up-conversion on the OFDM symbol with a CP and transmits the OFDM symbol from antenna port 2.

Inversion section 113 inverts the sign of $S_1$ transmitted from antenna port 3 between odd-numbered slots and even-numbered slots in synchronization with inversion section 114.

Inversion section 114 inverts the sign of R1 transmitted from antenna port 3 between odd-numbered slots and even-numbered slots in synchronization with inversion section 113.

IFFT section 115 performs an IFFT on $S_1$ and R1 to generate an OFDM symbol.

CP adding section 116 adds the same signal as that of the tail part of the OFDM symbol to the beginning of that OFDM symbol as a CP.

Radio transmitting section 117 performs transmission processing such as D/A conversion, amplification and up-conversion on the OFDM symbol with a CP and transmits the OFDM symbol from antenna port 1.

CDD generation section 118 generates CDD for $S_1$ and R1.

IFFT section 119 performs an IFFT on $S_1$ and R1 to generate an OFDM symbol.

CP adding section 120 adds the same signal as that of the tail part of the OFDM symbol to the beginning of that OFDM symbol as a CP.

Radio transmitting section 121 performs transmission processing such as D/A conversion, amplification and up-conversion on the OFDM symbol with a CP and transmits the OFDM symbol from antenna port 3.

CDD generation sections 109 and 118 are provided to suppress unnecessary beam forming effect caused by virtual antennas.

Figure 5:
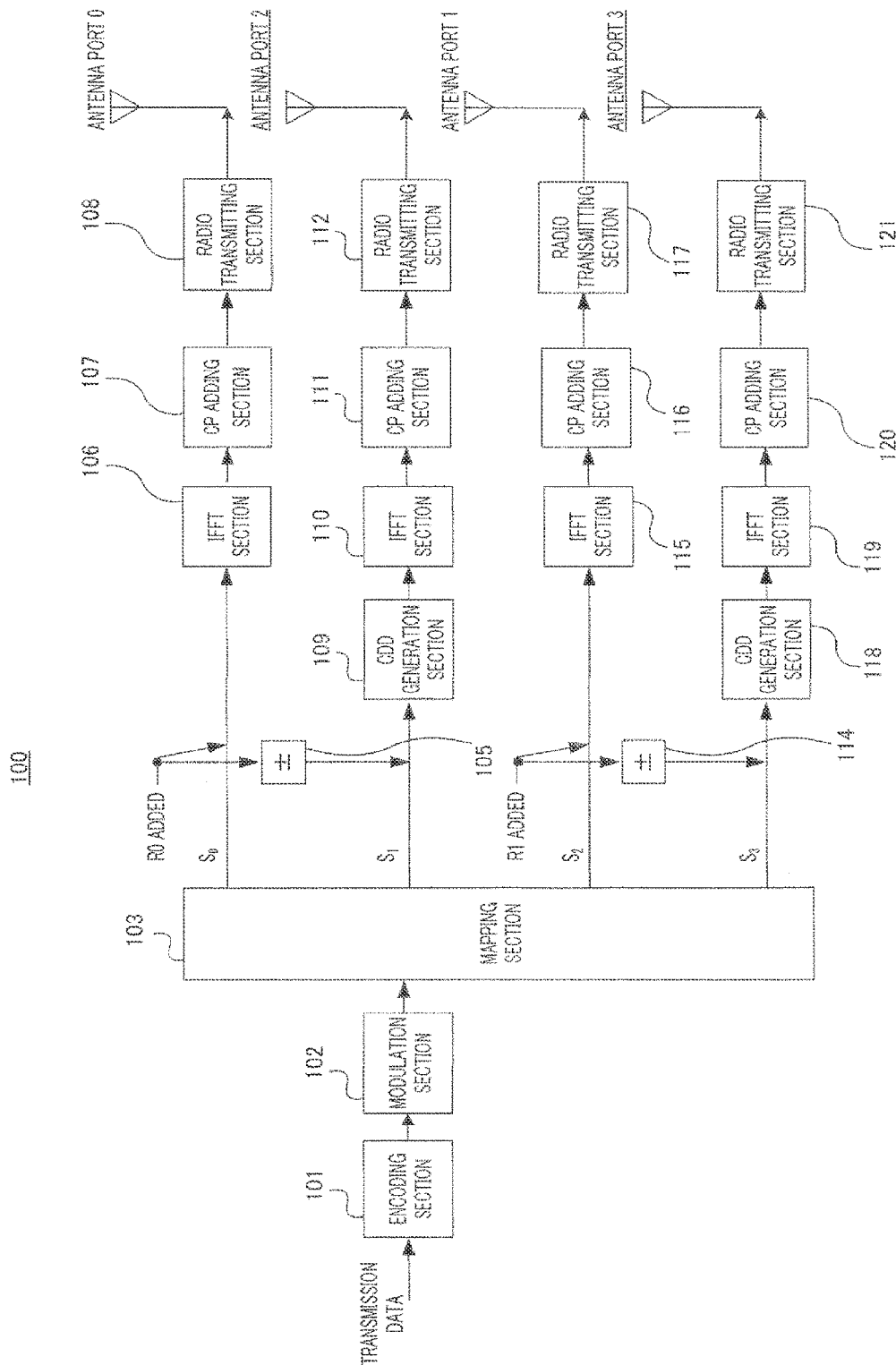
FIG. 5 is a block diagram illustrating a configuration of the base station according to Embodiment 1 of the present invention (when operating as a 4-Tx base station that carries out antenna port transmission)

Next, FIG. 5 illustrates a configuration of base station 100 that operates as a 4-Tx base station that carries out antenna port transmission. Base station 100 shown in FIG. 5 has no inversion sections 104 and 113 shown in FIG. 4. Hereinafter only the differences in FIG. 5 from FIG. 4 will be described.

That is, mapping section 103 maps modulated data signals to antenna ports 0, 2, 1 and 3. The data signal mapped to antenna port 0 is $S_0$, the data signal mapped to antenna port 2 is $S_1$, the data signal mapped to antenna port 1 is $S_2$ and the data signal mapped to antenna port 3 is $S_3$. Furthermore, the RS transmitted from antenna port 0 and antenna port 2 is R0 and the RS transmitted from antenna port 1 and antenna port 3 is R1.

CDD generation section 109 generates CDD to $S_1$ and R0.

IFFT section 110 performs an IFFT on $S_1$ and R0 to generate an OFDM symbol.

IFFT section 115 performs an IFFT on $S_2$ and R1 to generate an OFDM symbol.

CDD generation section 118 generates CDD to $S_3$ and R1.

IFFT section 119 performs an IFFT on $S_3$ and R1 to generate an OFDM symbol.

Here, base station 100 (a virtual 2-Tx base station) shown in FIG. 4 transmits RSs and data signals using two virtual antennas of virtual antenna 0 and virtual antenna 1. That is, suppose the basic transmission method of base station 100 is virtual antenna transmission.

However, between odd-numbered slots and even-numbered slots, the sign of the signal from one of the two antenna ports that form one virtual antenna is inverted. In FIG. 4, the signs of R0 and $S_0$ at antenna port 2 out of antenna port 0 and antenna port 2 that form virtual antenna 0 are inverted between odd-numbered slots and even-numbered slots. Likewise, the signs of R1 and $S_1$ at antenna port 3 out of antenna port 1 and antenna port 3 that form virtual antenna 1 are inverted between odd-numbered slots and even-numbered slots.

Figure 6:
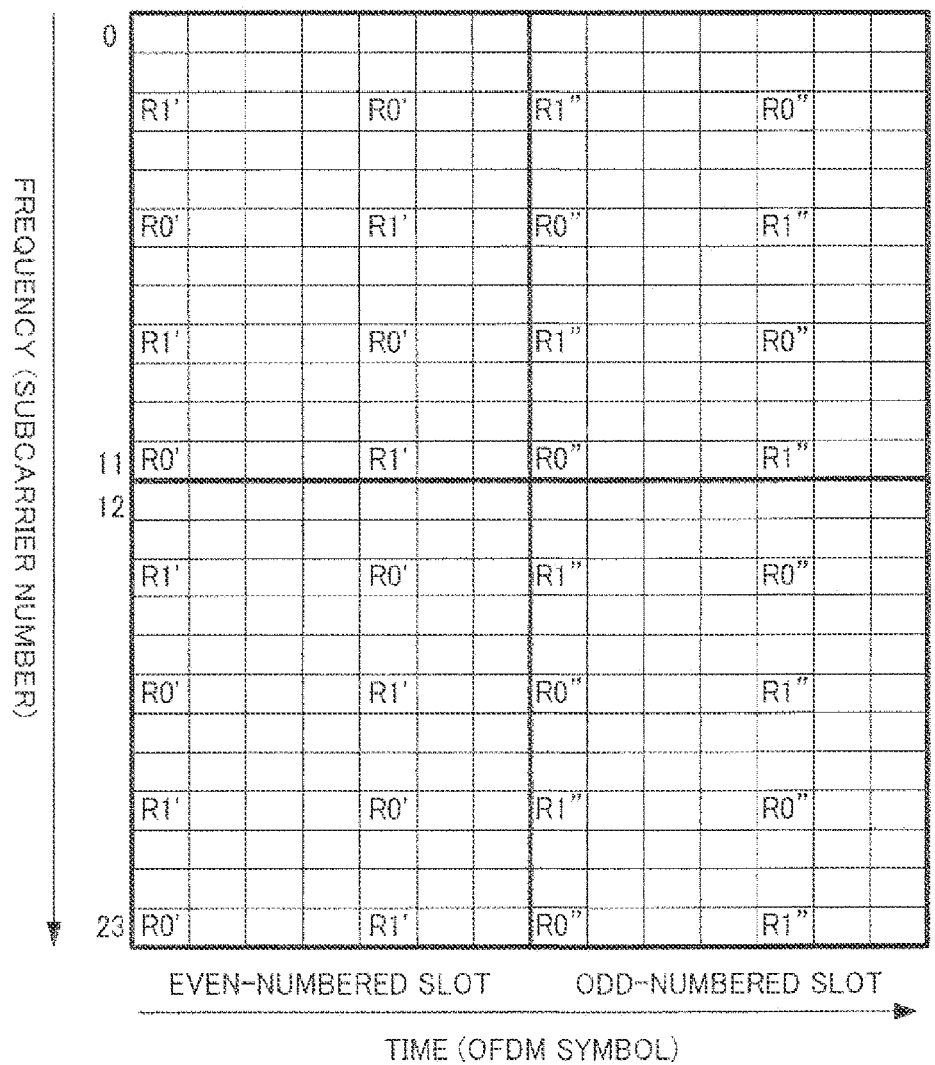
FIG. 6 illustrates an RS arrangement according to Embodiment 1 of the present invention.

Since base station 100 normally operates as a virtual 2-Tx base station, RSs from base station 100 are transmitted using the same resources (that is, the same timings and the same subcarriers) as for RSs from 2-Tx base stations that are present in the vicinity of base station 100. FIG. 6 shows the arrangement of RSs in this case. However, R0' in FIG. 6 indicates resources (the timings and frequencies) whereby R0 is transmitted from antenna port 0 and antenna port 2, and R0" indicates resources whereby R0 is transmitted from antenna port 0 and whereby on the other hand an RS with an inverted sign of R0 is transmitted from antenna port 2. Likewise, R1' in FIG. 6 indicates resources whereby R1 is transmitted from antenna port 1 and antenna port 3, and R1" indicates resources whereby R1 is transmitted from antenna port 1 and whereby on the other hand an RS with an inverted sign of R1 is transmitted from antenna port 3.

Therefore, a transmission signal y from base station 100 (a virtual 2-Tx base station) is represented as follows:

$$y = D\begin{pmatrix} 1 & 0 \\ 0 & 1 \\ 1 & 0 \\ 0 & 1 \end{pmatrix} s_{2Tx} \text{ even slot}, \; y = D\begin{pmatrix} 1 & 0 \\ 0 & 1 \\ -1 & 0 \\ 0 & -1 \end{pmatrix} s_{2Tx} \text{ odd slot} \quad [3]$$

As is evident from FIG. 6, the overhead required for RS transmission with the present embodiment is equivalent to that of a 2-Tx base station. That is, according to the present embodiment, the throughput is not decreased due to increased overhead.

Furthermore, since two radio transmitting sections can be used per virtual antenna, the transmission power for an RS and the transmission power for a data signal become twice these transmission powers at a 2-Tx base station. Therefore, received quality at the terminal can be improved.

Furthermore, since the same virtual antenna is used for an RS and data signal within one RB and the base station operates as a virtual 2-Tx base station, SNR performance does not deteriorate at a high-speed terminal.

Base station 100 usually transmits both RSs and data signals to both the high-speed terminal and low-speed terminal using virtual antenna 0 and virtual antenna 1.

The terminal demodulates the data signals using the received RSs on an as-is basis.

Furthermore, the terminal maintains two slots of RSs in the time domain, R0', R0", R1' and R1" maintained in this way have the following relationships:

Received signal in R0'=signal from antenna port 0+signal from antenna port 2

Received signal in R1'=signal from antenna port 1+signal from antenna port 3

Received signal in R0"=signal from antenna port 0−signal from antenna port 2

Received signal in R1"=signal from antenna port 1−signal from antenna port 3

Thus, the terminal can separate signals from antenna ports 0, 2, 1 and 3 using the following calculations and perform channel estimation for each antenna port.

Signal from antenna port 0=received signal in R0'+received signal in R0"

Signal from antenna port 2=received signal in R0'−received signal in R0" Signal from antenna port 1=received signal in R1'+received signal in R1"

Signal from antenna port 3=received signal in R1'−received signal in R1"

The terminal selects one of virtual antenna transmission and antenna port transmission from the four channel estimate values of antenna ports 0, 2, 1 and 3 as an optimal transmission method for base station 100 for that terminal, and feeds back the selection result to base station 100 as a transmission mode request. For example, when the correlation level between the four propagation paths of antenna ports 0, 2, 1 and 3 is low and SDM transmission can be carried out, it is generally preferable not to use virtual antenna transmission, and therefore antenna port transmission is selected. However, since the channel estimation results of antenna ports 2 and 3 also include the propagation characteristics by CDD generation sections 109 and 118, even when base station 100 carries out antenna port transmission in the configuration shown in FIG. 5, the same CDD generation section used during virtual antenna transmission (FIG. 4) is used.

Whether virtual antenna transmission (FIG. 4) or antenna port transmission (FIG. 5), base station 100 continues to transmit RSs while inverting signs at antenna ports 2 and 3.

Here, suppose the output from mapping section 103 of base station 100 (a 4-Tx base station) shown in FIG. 5 is:

$$s_{4Tx} = \begin{pmatrix} s_0 \\ s_1 \\ s_2 \\ s_3 \end{pmatrix} \quad [4]$$

a signal $y_{realport}$ transmitted from the four antenna ports is:

$$y_{realport} = D s_{4Tx} \quad [5]$$

Since the terminal that selects virtual antenna transmission and the terminal that selects antenna port transmission are multiplexed by OFDM, base station 100 switches between virtual antenna transmission (FIG. 4) and antenna port transmission (FIG. 5) for each terminal according to request from each terminal. That is, base station 100 includes a switching section that switches between virtual antenna transmission (FIG. 4) and antenna port transmission (FIG. 5) for each terminal according to request from each terminal, transmits RSs and data signals in the configuration shown in FIG. 4 to a low-speed terminal that requests virtual antenna transmission using virtual antennas and transmits data signals in the configuration shown in FIG. 5 to a low-speed terminal that requests antenna port transmission using antenna ports.

During virtual antenna transmission, each terminal performs channel estimation using RSs on an as-is basis. On the other hand, during antenna port transmission, each terminal separates RS for each antenna port and performs channel estimation using the separated RSs.

Here, high-speed terminals or terminals not supporting antenna port transmission using four antenna ports may request base station 100 for virtual antenna transmission and low-speed terminals or terminals capable of SDM may request base station 100 for antenna port transmission.

When requesting base station 100 for one transmission mode of virtual antenna transmission and antenna port transmission, the terminal may also request base station 100 to change the data signal mapping (Precoding Matrix) as well.

Upon receiving a request for virtual antenna transmission, base station 100 performs mapping for two antenna ports to the virtual antenna as shown in FIG. 4, and then further performs distribution to the four antenna ports at the virtual antennas. Therefore, the terminal requests base station 100 for an optimal mapping pattern out of a plurality of mapping patterns for two antenna ports although the number of antenna ports in base station 100 is four.

On the other hand, when the terminal requests base station 100 for antenna port transmission, the terminal requests base station 100 for an optimal mapping pattern out of the plurality of mapping patterns for four antenna ports.

The present embodiment can reduce overhead required for RS transmission compared to a conventional 4-Tx base station. Furthermore, since the density (total power) of RSs from antenna ports 2 and 3 is high, the present embodiment can improve the accuracy of channel estimation at the terminal. Furthermore, it is possible to increase the cell radius through transmission using virtual antennas. Furthermore, since the terminal can separate RSs from virtual antennas into RSs of individual antenna ports, it is possible to request the base station for an optimal transmission method when the base station performs SDM transmission.

A case has been described above with the present embodiment where upon receiving a signal from base station 100 (FIG. 4) operating as a virtual 2-Tx base station, the terminal is assumed to perform independent channel estimation for each slot and change the signs of virtual antennas for each slot. However, when the terminal performs channel estimation for every n slots, the signs of virtual antennas may be changed every n slots.

Furthermore, base station 100 in FIG. 4 and FIG. 5 need not be provided with CDD generation sections 109 and 118.

Furthermore, the present embodiment assumes the characteristics of virtual antennas as:

$$D\begin{pmatrix} 1 & 0 \\ 0 & 1 \\ 1 & 0 \\ 0 & 1 \end{pmatrix} \text{ even slot, } D\begin{pmatrix} 1 & 0 \\ 0 & 1 \\ -1 & 0 \\ 0 & -1 \end{pmatrix} \text{ odd slot} \quad [6]$$

However, for example, virtual antennas having the following characteristics may be used as well:

$$D\begin{pmatrix} 1 & 0 \\ 1 & 0 \\ 0 & 1 \\ 0 & 1 \end{pmatrix} \text{ even slot, } D\begin{pmatrix} 1 & 0 \\ -1 & 0 \\ 0 & 1 \\ 0 & -1 \end{pmatrix} \text{ odd slot} \quad [7]$$

In this case, the terminal separates signals from antenna ports 0, 1, 2 and 3 using the following calculations:

Signal from antenna port 0=received signal in R0'+received signal in R0"

Signal from antenna port 1=received signal in R0'−received signal in R0" Signal from antenna port 2=received signal in R1'+received signal in R1"

Signal from antenna port 3=received signal in R1'−received signal in R1"

That is, when two vectors in even-numbered slots and odd-numbered slots each made up of column components are extracted from the above 4×2 matrix expressing the characteristics of virtual antennas, these four vectors in total need to be orthogonal to each other. In more general terms, signals from individual antenna ports need to have been multiplexed so that the terminal can separate between the propagation paths of a plurality of antenna ports through which signals are transmitted at the same time and using the same frequency using RSs received a plurality of times.

Furthermore, the present embodiment assumes that the signs of virtual antennas are changed (inverted) per slot in the time domain, and, on the other hand, the signs of virtual antennas are fixed in the frequency domain. However, the signs of virtual antennas may also be changed (inverted) per RB in the frequency domain, and, on the other hand, the signs of virtual antenna may be fixed in the time domain. In this case, since the characteristics of virtual antennas used for RS transmission do not change in the time domain, RSs received by a terminal are averaged over a plurality of slots, so that the accuracy of channel estimation at the terminal can be improved. However, in this case, since the robustness against frequency selective fading decreases, the mode in which the signs of virtual antennas in the time domain are changed and the mode in which the signs of virtual antennas in the frequency domain are changed may be switched adaptively according to the state of the propagation path.

A case has been described above with the present embodiment where the base station forms one virtual antenna with two antenna ports. However, the number of antenna ports to form one virtual antenna with, is not limited to two in the present invention. For example, the base station may form one virtual antenna with four antenna ports. However, in order for a terminal to separate between the propagation paths of individual antenna ports, when one virtual antenna is formed with two antenna ports, RSs of two slots (e.g., R0' and R0" shown in FIG. 6) are necessary, whereas, when one virtual antenna is formed with four antenna ports, four slots of RSs are necessary. For example, a base station that forms one virtual antenna with four antenna ports transmits R0', R0", R0''' and R0'''' for which the signs of a virtual antenna is changed per slot in the time domain. A terminal separates between the signals of individual antenna ports using R0', R0", R0''' and R0'''' and performs channel estimation per antenna port.

Furthermore, a base station may adaptively change the number of antenna ports to form one virtual antenna with, according to the situation of a terminal. That is, when a base station is provided with four antenna ports, the base station may switch between the operation for forming one virtual antenna with two antenna ports and the operation for forming one virtual antenna with four antenna ports according to the situation of the terminal as shown with the present embodiment.

For example, when a terminal is moving at high speed and the variation of the propagation path in the time domain direction is significant, the state of the propagation path changes while four RSs are being transmitted in the time domain direction and the terminal may not be able to separate signals correctly. Therefore, the base station may switch the number of antenna ports to form the virtual antenna with, according to the moving speed of a terminal. For example, a base station forms one virtual antenna with two antenna ports for a terminal moving at high speed and arranges two RS's with changed signs in two slots. On the other hand, the base station forms one virtual antenna with four antenna ports for a terminal moving at low speed and arranges four RSs with changed signs in four slots. In this way, it is possible to realize optimal operations according to the moving speed of the terminal while minimizing the overhead of RSs.

Embodiment 2

The present embodiment differs from Embodiment 1 in that RS and BCH signal are regularly transmitted by virtual antenna transmission through a BCH for indicating the number of antenna ports.

Therefore, according to the present embodiment, a terminal can provide a diversity effect through a BCH irrespective of the number of antenna ports in a base station. Furthermore, a terminal separates between the propagation paths of two antenna ports and performs channel estimation, and a terminal can thereby optimize transmission weights of the base station after receiving a BCH signal.

Here, BCH signals having the same information are repeatedly transmitted through the BCH. Furthermore, the transmission of BCH signals continues by regularly occupying part of the frequency band. Furthermore, BCH signals are received by all terminals. Furthermore, upon receiving a BCH signal, the number of antenna ports in a base station is unknown to the terminal.

Thus, the present embodiment adopts a common RS arrangement independent of the number of antenna ports, thereby reducing the reception load on a terminal and providing diversity gain equivalent to SFBC (Space-Frequency Block Coding).

Hereinafter transmission of a BCH signal according to the present embodiment will be described.

Figure 7:
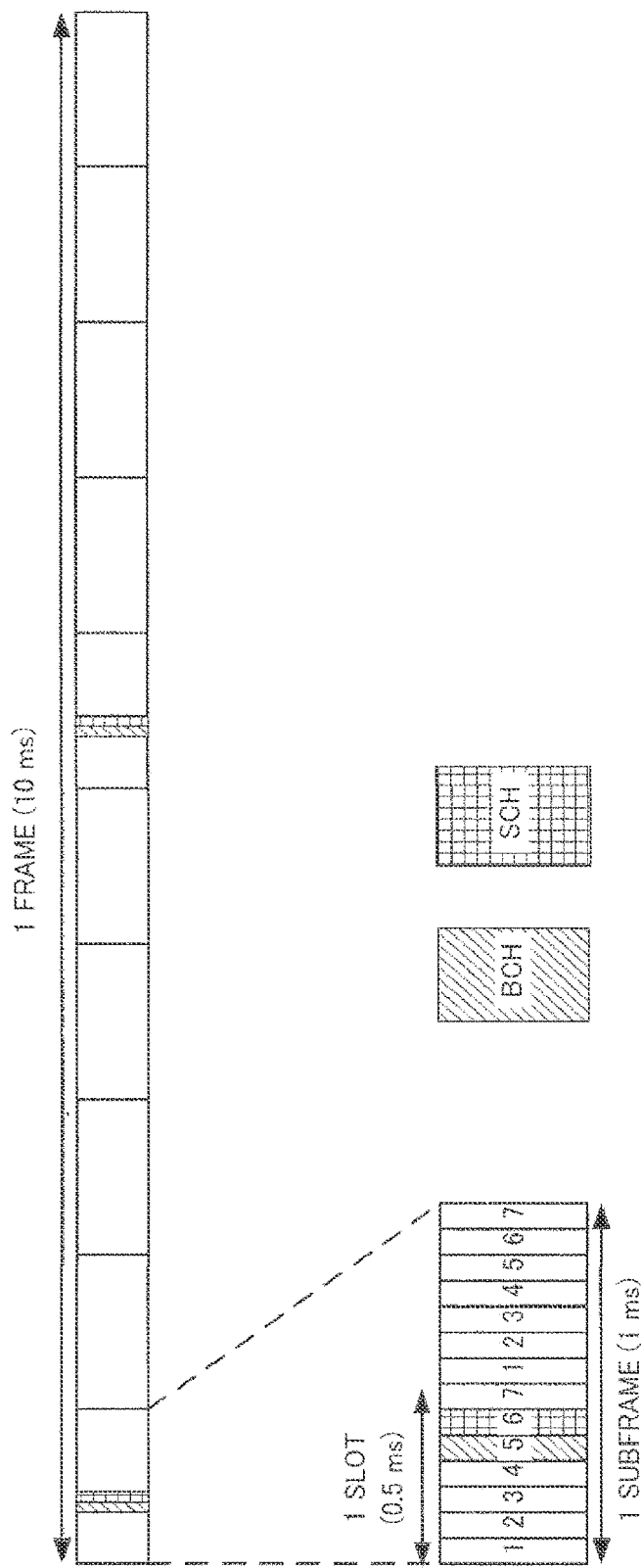
FIG. 7 illustrates an arrangement of a BCH and an SCH in the time domain according to 3 GPP-LTE.

According to a 3GPP-LTE procedure, a terminal acquires the SCH (Synchronization CHannel) at the start of communication with a base station, establishes timing synchronization with the base station and then receives a BCH signal. FIG. 7 shows the arrangement of the BCH and SCH in the time domain according to 3GPP-LTE. One slot in FIG. 7 corresponds to one RB time.

Figure 8:
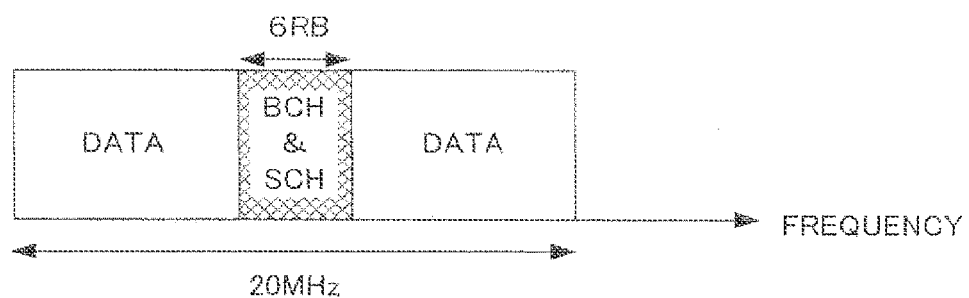
FIG. 8 illustrates an arrangement of data channels and control channels of a BCH and an SCH in the frequency domain according to 3GPP-LTE.

Furthermore, FIG. 8 illustrates an arrangement of data channels and the BCH and SCH control channels in the frequency domain according to 3GPP-LTE. These control channel signals are transmitted from the base station using 72 subcarriers=6 RBs.

When transmitting an RS, BCH signal and SCH signal in a frequency band including the BCH and SCH shown in FIG. 8, the 2-Tx base station according to the present embodiment handles two antenna ports as one virtual antenna. However, the 2-Tx base station inverts the sign of the signal from antenna port 1 per RB in the time domain. Furthermore, the 2-Tx base station operates as a normal 2-Tx base station (FIG. 1A) in a frequency band not including the BCH and SCH.

Figure 9:
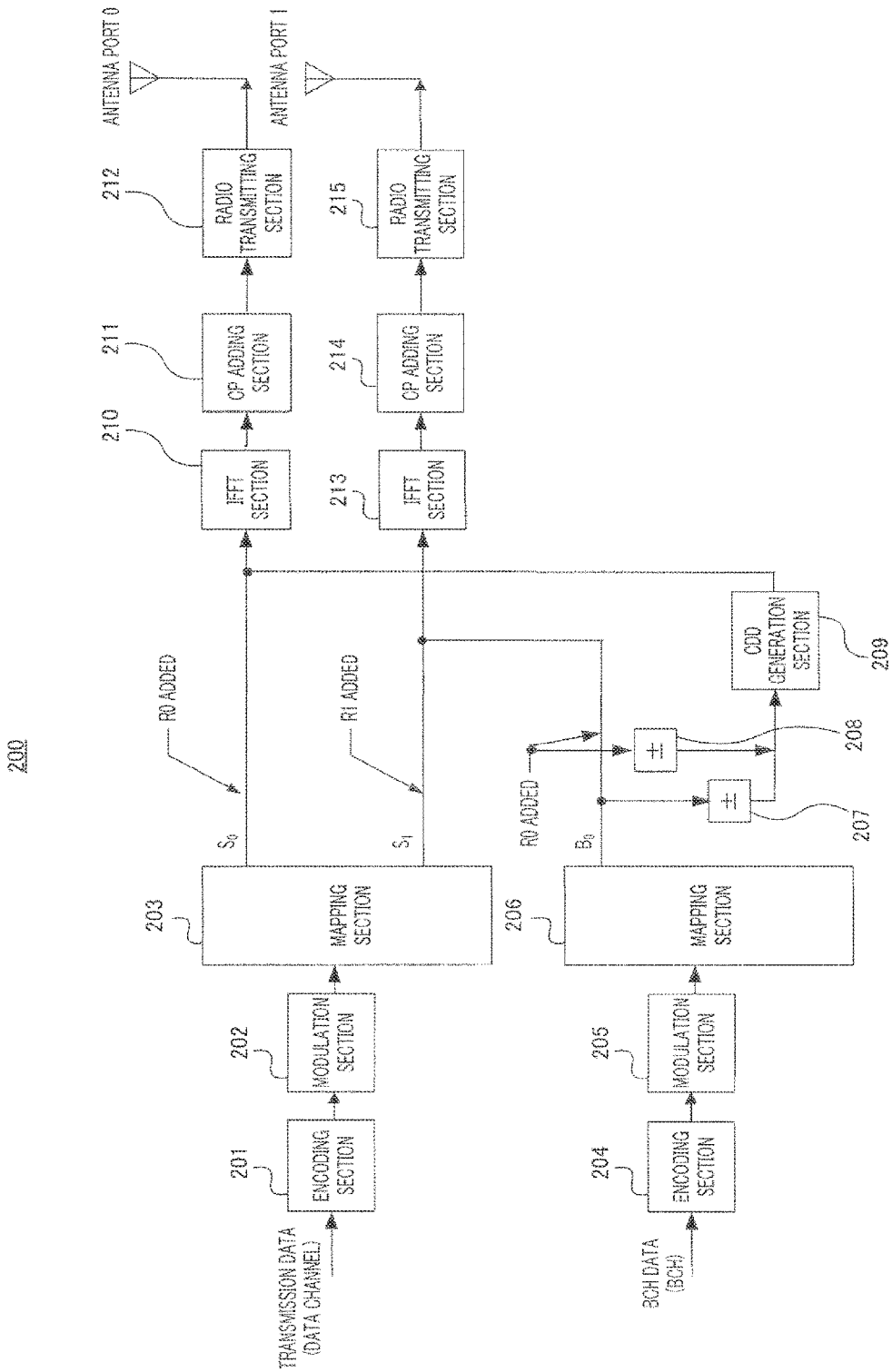
FIG. 9 is a block diagram illustrating a configuration of a base station according to Embodiment 2 of the present invention.

FIG. 9 illustrates a configuration of base station 200 according to the present embodiment.

In base station 200 shown in FIG. 9, encoding section 201 encodes transmission data (data channel).

Modulation section 202 modulates the encoded data.

Mapping section 203 maps modulated data signals to antenna port 0 and antenna port 1. The data signal mapped to antenna port 0 is $S_0$ and the data signal mapped to antenna port 1 is $S_1$. Furthermore, RS added to $S_0$ and transmitted from antenna port 0 is R0 and RS added to $S_1$ and transmitted from antenna port 1 is R1.

On the other hand, encoding section 204 encodes BCH data (BCH).

Modulation section 205 modulates the encoded BCH data.

Mapping section 206 maps the modulated BCH data signal to virtual antenna 0 formed with antenna port 0 and antenna port 1. The BCH data signal mapped to virtual antenna 0 is $B_0$.

Inversion section 207 inverts the sign of $B_0$ transmitted from antenna port 0 between odd-numbered slots and even-numbered slots in synchronization with inversion section 208.

inversion section 208 inverts the sign of R0 added to $B_0$ and transmitted from antenna port 0 between odd-numbered slots and even-numbered slots in synchronization with inversion section 207.

CDD generation section 209 generates CDD for $B_0$ and R0.

IFFT section 210 performs an IFFT on $S_0$, R0 and $B_0$, R0 to generate an OFDM symbol.

CP adding section 211 adds the same signal as that of the tail part of the OFDM symbol to the beginning of that OFDM symbol as a CP.

Radio transmitting section 212 performs transmission processing such as D/A conversion, amplification and up-conversion on the OFDM symbol with a CP and transmits the OFDM symbol from antenna port 0.

IFFT section 213 performs an IFFT on $S_1$, R1 and $B_0$, R0 to generate an OFDM symbol.

CP adding section 214 adds the same signal as the tail part of the OFDM symbol to the beginning of that OFDM symbol as a CP.

Radio transmitting section 215 performs transmission processing such as D/A conversion, amplification and up-conversion on the OFDM symbol with a CP and transmits the OFDM symbol from antenna port 1.

Thus, antenna port 0 and antenna port 1 function as virtual antenna 0 on the BCH.

CDD generation section 209 is provided to suppress unnecessary beam forming effect caused by virtual antennas.

Figure 10A:
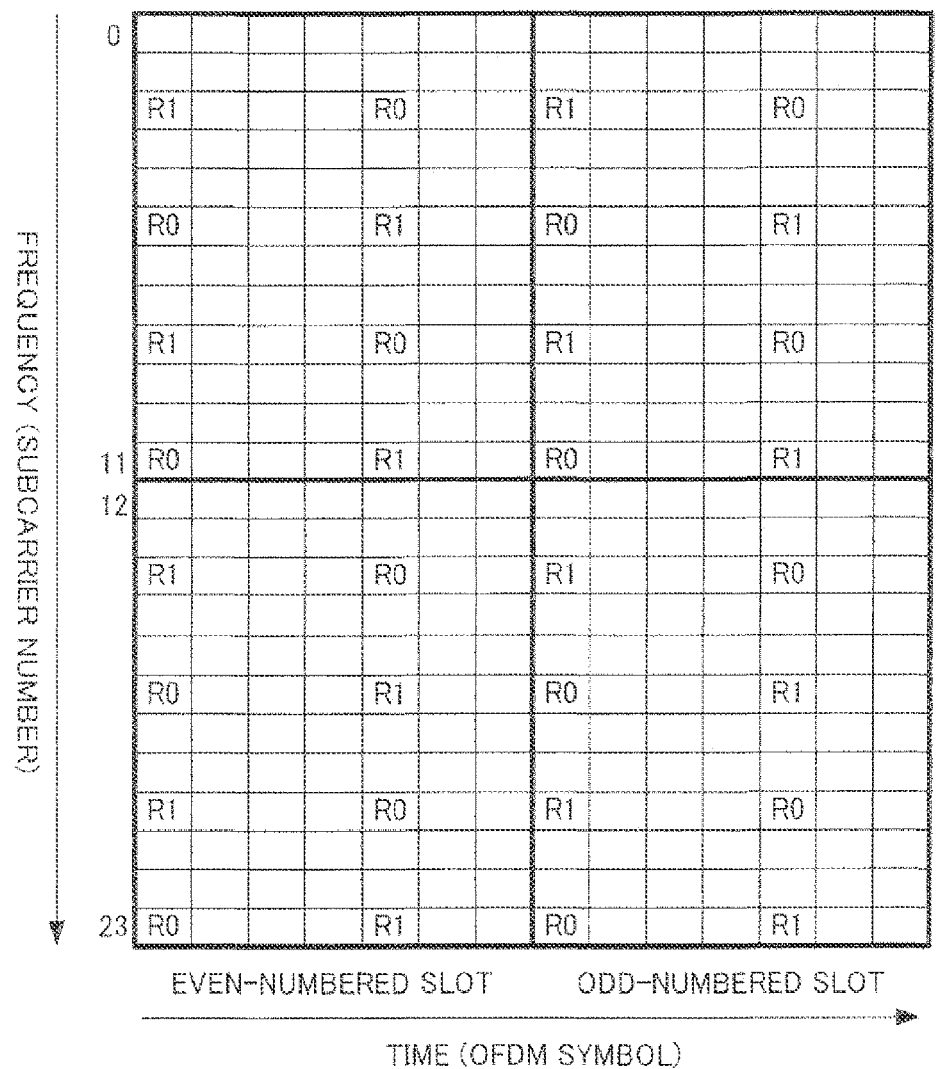
FIG. 10A illustrates an RS arrangement according to Embodiment 2 of the present invention (the frequency band not including the BCH)
Figure 10B:
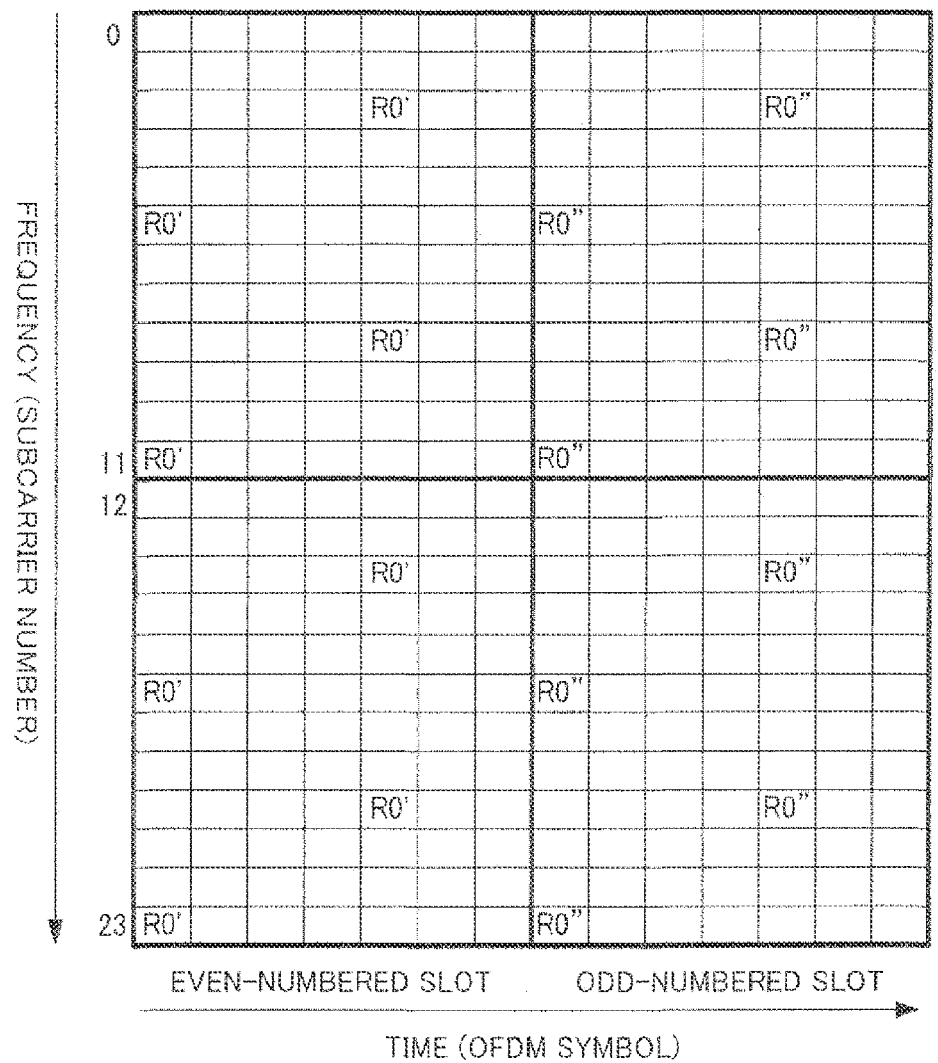
FIG. 10B illustrates an RS arrangement according to Embodiment 2 of the present invention (the frequency band including the BCH)
Figure 11:
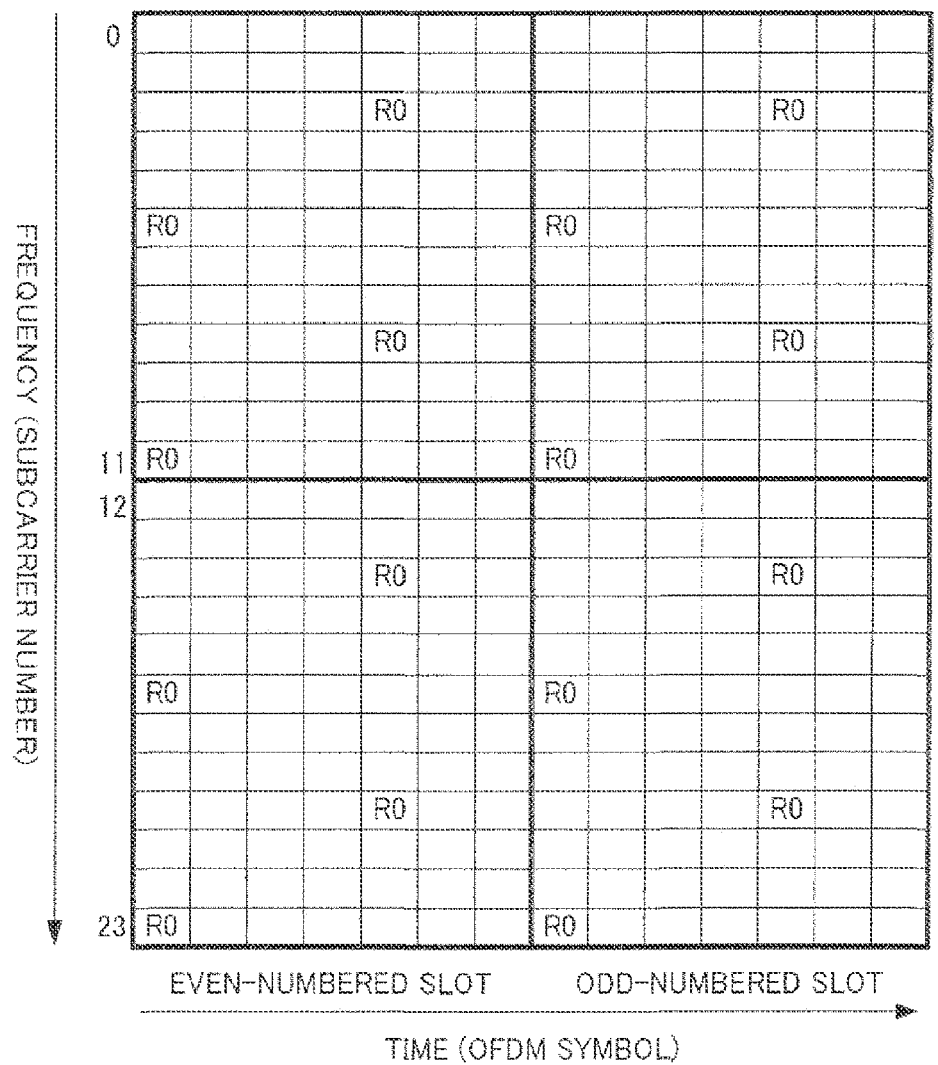
FIG. 11 illustrates an RS arrangement of a conventional 1-Tx base station.

Next, FIG. 10A and FIG. 10B illustrate the arrangement of RSs according to the present embodiment. FIG. 10A illustrates an arrangement of RSs in the frequency band not including the BCH, that is, the arrangement of RSs in data channel bands and FIG. 10B illustrates the arrangement of RSs in the frequency band including the BCH. Furthermore, FIG. 11 illustrates an arrangement of RSs at a conventional 1-Tx base station. R0' in FIG. 10B indicates resources whereby R0 is transmitted from antenna port 0 and antenna port 1, and R0" indicates resources whereby R0 is transmitted from antenna port 0 and whereby on the other hand an RS with an inverted sign of R0 is transmitted from antenna port 1.

Thus, base station 200 adopts an RS arrangement (FIG. 10B) in the frequency band including the BCH identical to the RS arrangement (FIG. 11) at the 1-Tx base station.

By contrast, the terminal receives SCH (FIG. 7) transmitted from the base station and acquires synchronization. Since this SCH is a sequence that is known to the terminal in advance, the terminal can acquire synchronization by finding the cross-correlation between the prestored, known SCH sequence and the received signal sequence. SCH is transmitted via the virtual antenna in the same way as BCH.

After acquiring synchronization, the terminal receives R0' or R0", performs channel estimation and decodes the BCH sequence.

Here, base station 200 synchronizes the sign of the BCH with the sign of the virtual antenna used to transmit R0' (or R0"). Therefore, the terminal needs not judge whether the received signal is R0' or R0".

Furthermore, base station 200 inverts signs between the sign of the virtual antenna used in the first slot of the first subframe and the signs of virtual antennas used in the first slot of the sixth subframe in FIG. 7, and therefore can receive the BCH and the SCH through diversity effect even in areas where the BCH and the SCH normally do not arrive.

After receiving BCH, the terminal judges the number of antenna ports in a base station based on the BCH data and judges the RS transmission method in the frequency band in which data is transmitted according to the number of antenna ports.

According to the present embodiment, in a communication system in which a 1-Tx base station and a 2-Tx base station are both present, the terminal can receive BCH using a reception method that is common between the 1-Tx base station and the 2-Tx base station. Therefore, the terminal can receive BCH with no errors without knowing the number of antenna ports in a base station. That is, diversity transmission by a 2-Tx base station through a BCH is made possible.

Furthermore, when a BCH is transmitted by handling two antenna ports as one virtual antenna using a method similar to the conventional one, RS is also transmitted via the virtual antenna, and therefore the terminal cannot separate between the propagation paths of the two antenna ports. By contrast, according to the present embodiment, the base station transmits RS while changing (inverting) the signs of virtual antennas, and therefore the terminal can separate between the propagation paths of the two antenna ports.

Furthermore, the present embodiment limits the frequency band using virtual antennas to some bands including the BCH. Therefore, in a frequency band not using virtual antennas (e.g., the frequency band of the data channel), it is possible to improve the accuracy of channel estimation by averaging RSs received at a terminal in the time domain.

Furthermore, according to the present embodiment, in a communication system in which a plurality of base stations with different numbers of antenna ports are present, a terminal can receive a diversity effect for each base station while realizing a common RS arrangement, so that it is possible to increase the degree of freedom in the design of the communication system.

Transmission of control information other than the BCH can also be carried out in the same way as the transmission of the BCH.

Furthermore, when the SCH is transmitted via a virtual antenna in the same way as the BCH, it is preferable to generate CDD for the BCH alone and not generate CDD for the SCH. This eliminates additional arrival time differences by CDD among a plurality of antenna ports, so that it is possible to improve the performance of acquiring synchronization using the SCH.

Diversity effect is compared between the BCH transmission according to the present embodiment and the BCH transmission using SFBC as follows. Here, suppose the number of transmitting antenna ports in the base station is 2 and the number of receiving antenna ports of the terminal is 1, the characteristics of the propagation path from antenna port 0 of the base station to the antenna port of the terminal is $h_0(f)$ and the characteristics of the propagation path from antenna port 1 of the base station to the antenna port of the terminal is $h_1(f)$.

In BCH transmission using SFBC, the received power of the terminal is given by:

$$\sum_f \{h_0^2(f) + h_1^2(f)\} \quad [8]$$

On the other hand, in BCH transmission according to the present embodiment, the received power of the terminal is given by:

$$\sum_f \{h_0(f) + e^{-j2\pi f\delta} h_1(f)\}^2 \text{ even slot,} \quad [9]$$

-continued
$$\sum_f \{h_0(f) - e^{-j2\pi f\delta} h_1(f)\}^2 \text{ odd slot}$$

where, $e^{-j2\pi f\delta}$ is the CDD component.

Therefore, according to the present embodiment, the average received power of BCH at the terminal is:

$$\frac{\sum_f \{h_0(f) + e^{-j2\pi f\delta} h_1(f)\}^2 + \sum_f \{h_0(f) - e^{-j2\pi f\delta} h_1(f)\}^2}{\sum_f \{h_0^2(f) + |e^{-j2\pi f\delta}|^2 h_1^2(f)\} = \sum_f \{h_0^2(f) + h_1^2(f)\}} = \quad [10]$$

which is equal to the average received power of SFBC.

Furthermore, the maximum received power of BCH transmission according to the present embodiment is greater than the maximum received power of BCH transmission by SFBC. Therefore, according to BCH transmission according to the present embodiment, the maximum outreach of BCH can be greater than that of BCH transmission by SFBC. Therefore, the present embodiment can provide diversity effect exceeding SFBC for information transmitted a plurality of times repeatedly as with BCH.

Embodiment 3

The present embodiment is different from Embodiment 1 in that a base station with eight antenna ports (8-Tx base station) transmits data signals.

The number of antenna ports in a base station according to 3GPP-LTE is four at a maximum. Therefore, a 3GPP-LTE-compliant terminal can demodulate data and measure quality of a downlink signal using the RS transmitted from a base station provided with a maximum of four antenna ports (a 4-Tx base station).

By contrast, LTE-advanced, which is a developed version of 3GPP-LTE, is studying a base station provided with a maximum of eight antenna ports (8-Tx base station). However, even LTE-advanced needs to provide a 3GPP-LTE-compliant base station so as to allow terminals supporting only 3GPP-LTE-compliant base stations (a 4-Tx base station) to communicate. In other words, in a communication system in which a 4-Tx base station (a base station according to 3GPP-LTE) and an 8-Tx base station (a base station according to LTE-advanced) are both present, a terminal that supports 4-Tx base stations alone (hereinafter referred to as "LTE terminal") and a terminal also supporting 8-Tx base stations (hereinafter referred to as an "LTE+ terminal") need to be able to communicate with each other in the same frequency band.

Therefore, an 8-Tx base station according to the present embodiment transmits RS and data signals to LTE terminals using four virtual antennas, each made up of two antenna ports (virtual antenna transmission). Furthermore, the 8-Tx base station according to the present embodiment transmits RS and data signals to LTE+ terminals suitable for transmission of data signals using eight antenna ports, without using virtual antennas yet using eight antenna ports (antenna port transmission).

However, during antenna port transmission, the 8-Tx base station according to the present embodiment inverts the sign of one of the two RS which are arranged only in the frequency band in which data signals are transmitted via antenna ports, and which are transmitted in common from two antenna ports forming one virtual antenna.

Base station 300 according to the present embodiment will be described in detail.

Figure 12:
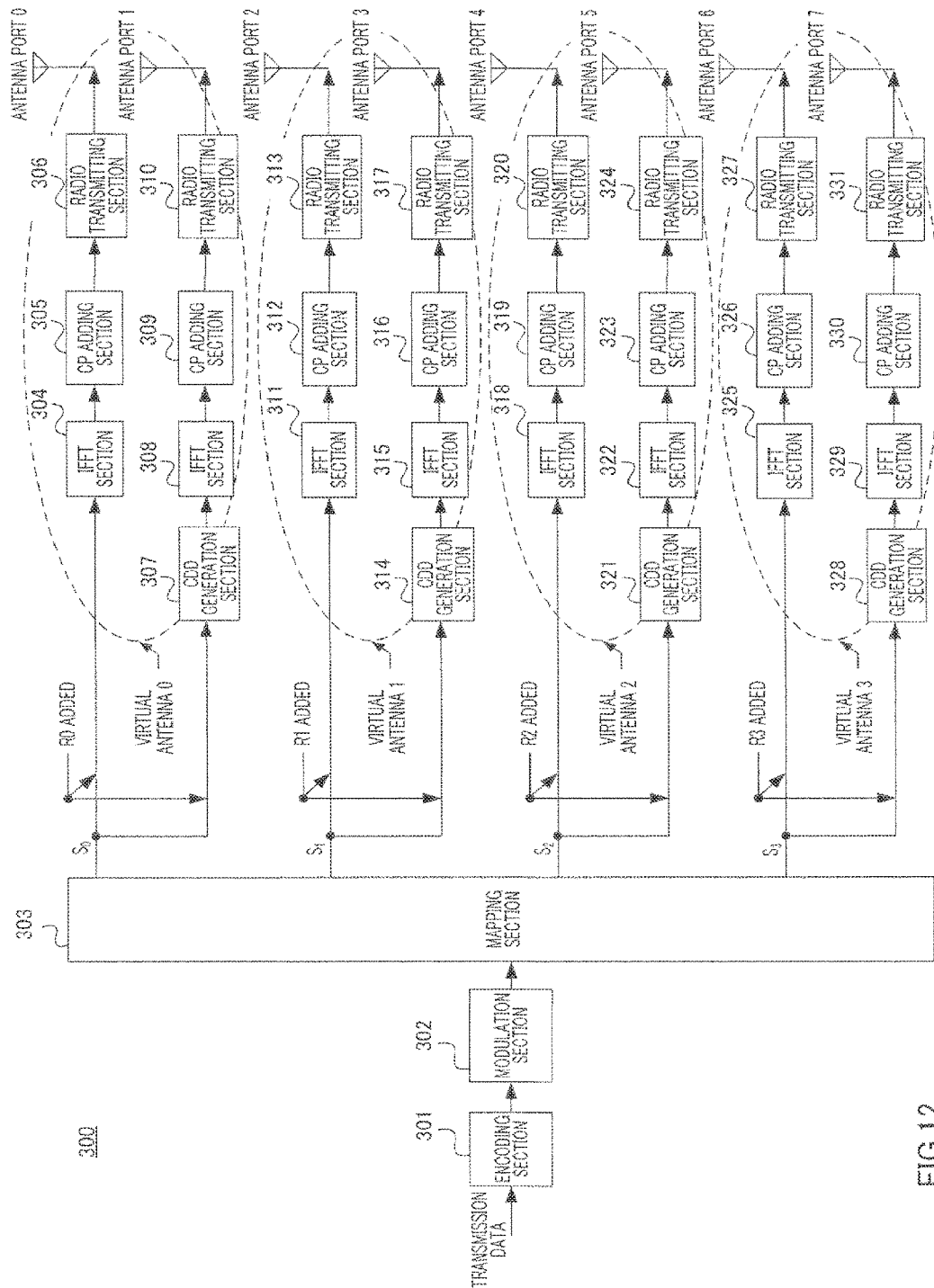
FIG. 12 is a block diagram illustrating a configuration of a base station according to Embodiment 3 of the present invention (when operating as a virtual 4-Tx base station that carries out virtual antenna transmission)

FIG. 12 illustrates a configuration of base station 300 that operates as a virtual 4-Tx base station that carries out virtual antenna transmission.

In base station 300 shown in FIG. 12, encoding section 301 encodes transmission data.

Modulation section 302 modulates the encoded data.

Mapping section 303 maps modulated data signals to virtual antenna 0, virtual antenna 1, virtual antenna 2 and virtual antenna 3. The data signal mapped to virtual antenna 0 is $S_0$, the data signal mapped to virtual antenna 1 is $S_1$, the data signal mapped to virtual antenna 2 is $S_2$ and the data signal mapped to virtual antenna 3 is $S_3$. Furthermore, the RS transmitted from virtual antenna 0 is R0, the RS transmitted from virtual antenna 1 is R1, the RS transmitted from virtual antenna 2 is R2 and the RS transmitted from virtual antenna 3 is R3.

IFFT section 304 performs an IFFT on $S_0$ and R0, to generate an OFDM symbol.

CP adding section 305 adds the same signal as that of the tail part of the OFDM symbol to the beginning of that OFDM symbol as a CP.

Radio transmitting section 306 performs transmission processing such as D/A conversion, amplification and up-conversion on the OFDM symbol with a CP and transmits the OFDM symbol from antenna port 0.

CDD generation section 307 generates CDD for $S_0$ and R0.

IFFT section 308 performs an IFFT on $S_0$ and R0, to generate an OFDM symbol.

CP adding section 309 adds the same signal as that of the tail part of the OFDM symbol to the beginning of that OFDM symbol as a CP.

Radio transmitting section 310 performs transmission processing such as D/A conversion, amplification and up-conversion on the OFDM symbol with a CP and transmits the OFDM symbol from antenna port 1.

IFFT section 311 performs an IFFT on $S_1$ and R1, to generate an OFDM symbol.

CP adding section 312 adds the same signal as that of the tail part of the OFDM symbol to the beginning of that OFDM symbol as a CP.

Radio transmitting section 313 performs transmission processing such as D/A conversion, amplification and up-conversion on the OFDM symbol with a CP and transmits the OFDM symbol from antenna port 2.

CDD generation section 314 generates CDD for $S_1$ and R1.

IFFT section 315 performs an IFFT on $S_1$ and R1, to generate an OFDM symbol.

CP adding section 316 adds the same signal as that of the tail part of the OFDM symbol to the beginning of that OFDM symbol as a CP.

Radio transmitting section 317 performs transmission processing such as D/A conversion, amplification and up-conversion on the OFDM symbol with a CP and transmits the OFDM symbol from antenna port 3.

IFFT section 318 performs an IFFT on $S_2$ and R2, to generate an OFDM symbol.

CP adding section 319 adds the same signal as that of the tail part of the OFDM symbol to the beginning of that OFDM symbol as a CP.

Radio transmitting section 320 performs transmission processing such as D/A conversion, amplification and up-conversion on the OFDM symbol with a CP and transmits the OFDM symbol from antenna port 4.

CDD generation section 321 generates CDD for $S_2$ and R2.

IFFT section 322 performs an IFFT on $S_2$ and R2, to generate an OFDM symbol.

CP adding section 323 adds the same signal as that of the tail part of the OFDM symbol to the beginning of that OFDM symbol as a CP.

Radio transmitting section 324 performs transmission processing such as D/A conversion, amplification and up-conversion on the OFDM symbol with a CP and transmits the OFDM symbol from antenna port 5.

IFFT section 325 performs an IFFT on $S_3$ and R3, to generate an OFDM symbol.

CP adding section 326 adds the same signal as that of the tail part of the OFDM symbol to the beginning of that OFDM symbol as a CP.

Radio transmitting section 327 performs transmission processing such as D/A conversion, amplification and up-conversion on the OFDM symbol with a CP and transmits the OFDM symbol from antenna port 6.

CDD generation section 328 generates CDD for $S_3$ and R3.

IFFT section 329 performs an IFFT on $S_3$ and R3, to generate an OFDM symbol.

CP adding section 330 adds the same signal as that of the tail part of the OFDM symbol to the beginning of that OFDM symbol as a CP.

Radio transmitting section 331 performs transmission processing such as D/A conversion, amplification and up-conversion on the OFDM symbol with a CP and transmits the OFDM symbol from antenna port 7.

CDD generation sections 307, 314, 321 and 328 are provided to suppress unnecessary beam forming effect caused by virtual antennas.

Figure 13:
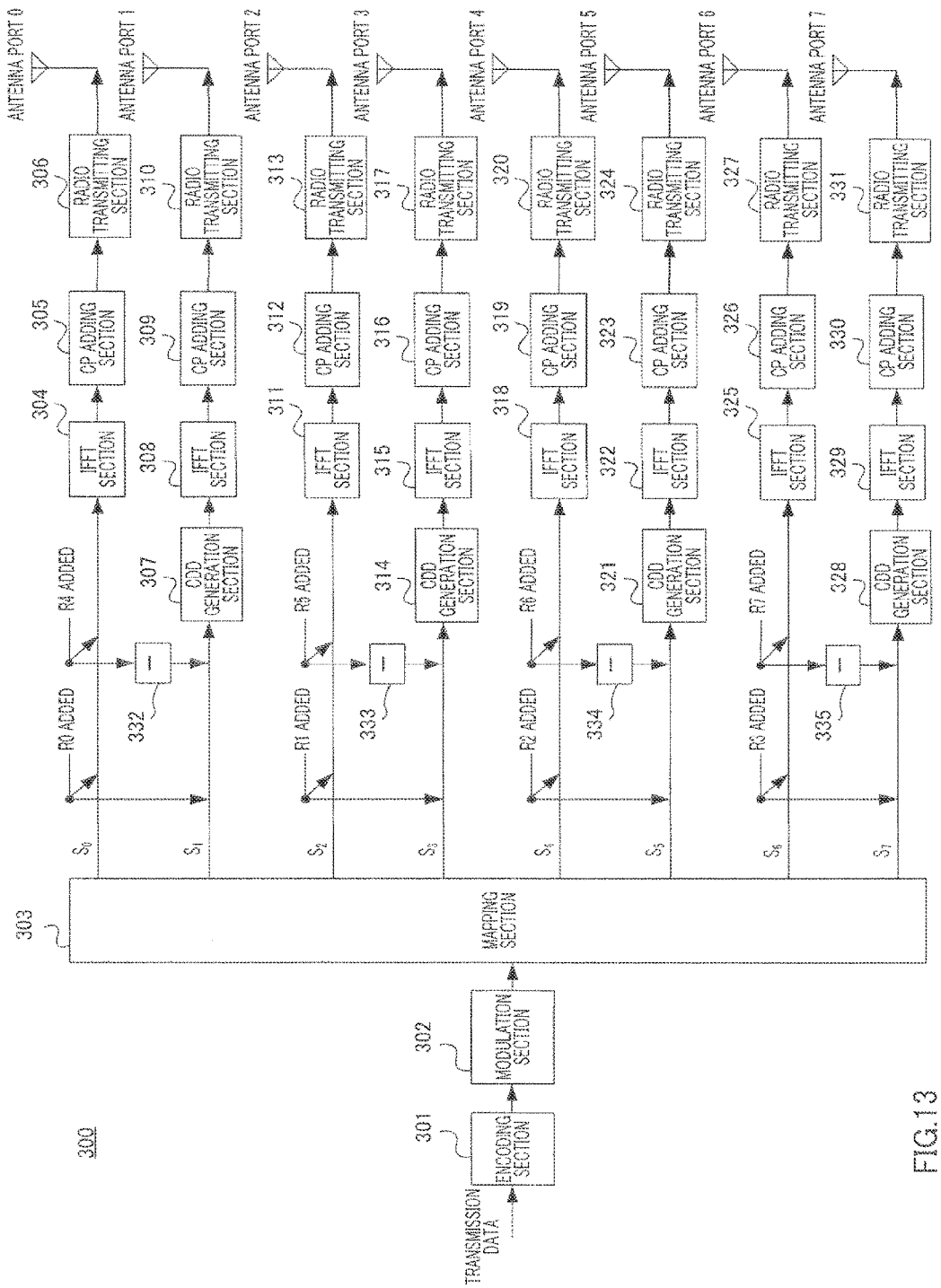
FIG. 13 is a block diagram illustrating a configuration of the base station according to Embodiment 3 of the present invention (when operating as an 8-Tx base station that carries out antenna port transmission)

Next, FIG. 13 illustrates a configuration of base station 300 operating as an 8-Tx base station that carries out antenna port transmission. In FIG. 13, only differences from FIG. 12 will be described.

That is, mapping section 303 maps modulated data signals $S_0$ to $S_7$ to antenna ports 0 to 7 respectively. Furthermore, the RSs transmitted from antenna port 0 and antenna port 1 are R0 and R4, the RSs transmitted from antenna port 2 and antenna port 3 are R1 and R5, the RSs transmitted from antenna port 4 and antenna port 5 are R2 and R6 and the RSs transmitted from antenna port 6 and antenna port 7 are R3 and R7. That is, base station 300 that performs antenna port transmission (8-Tx base station) further transmits R4 to R7 in addition to RSs transmitted through the virtual antenna transmission shown in FIG. 12.

IFFT section 304 performs an IFFT on $S_0$, R0 and R4, to generate an OFDM symbol.

Inversion section 332 inverts the sign of R4 transmitted from antenna port 1.

CDD generation section 307 generates CDD for $S_1$, R0 and R4.

IFFT section 308 performs an IFFT on $S_1$, R0 and R4, to generate an OFDM symbol.

IFFT section 311 performs an IFFT on $S_2$, R1 and R5, to generate an OFDM symbol.

Inversion section 333 inverts the sign of R5 transmitted from antenna port 3.

CDD generation section 314 generates CDD for $S_3$, R1 and R5.

IFFT section 315 performs an IFFT on $S_3$, R1 and R5, to generate an OFDM symbol.

IFFT section 318 performs an IFFT on $S_4$, R2 and R6, to generate an OFDM symbol.

Inversion section 334 inverts the sign of R6 transmitted from antenna port 5.

CDD generation section 321 generates CDD for $S_5$, R2 and R6.

IFFT section 322 performs an IFFT on $S_5$, R2 and R6, to generate an OFDM symbol.

IFFT section 325 performs an IFFT on $S_6$, R3 and R7, to generate an OFDM symbol.

Inversion section 335 inverts the sign of R7 transmitted from antenna port 7.

CDD generation section 328 generates CDD for $S_7$, R3 and R7.

IFFT section 329 performs an IFFT on $S_7$, R3 and R7, to generate an OFDM symbol.

Here, for R4 to R7 only transmitted during antenna port transmission, base station 300 shown in FIG. 13 inverts the sign of the RS transmitted from one of the two antenna ports forming one virtual antenna in FIG. 12. That is, base station 300 inverts the sign of R4 transmitted from antenna port 1 out of antenna port 0 and antenna port 1 forming virtual antenna 0 in FIG. 12. Likewise, base station 300 inverts the sign of R5 transmitted from antenna port 3 out of antenna port 2 and antenna port 3 forming virtual antenna 1 in FIG. 12. The same applies to virtual antennas 2 and 3 (antenna ports 4 to 7).

Figure 14:
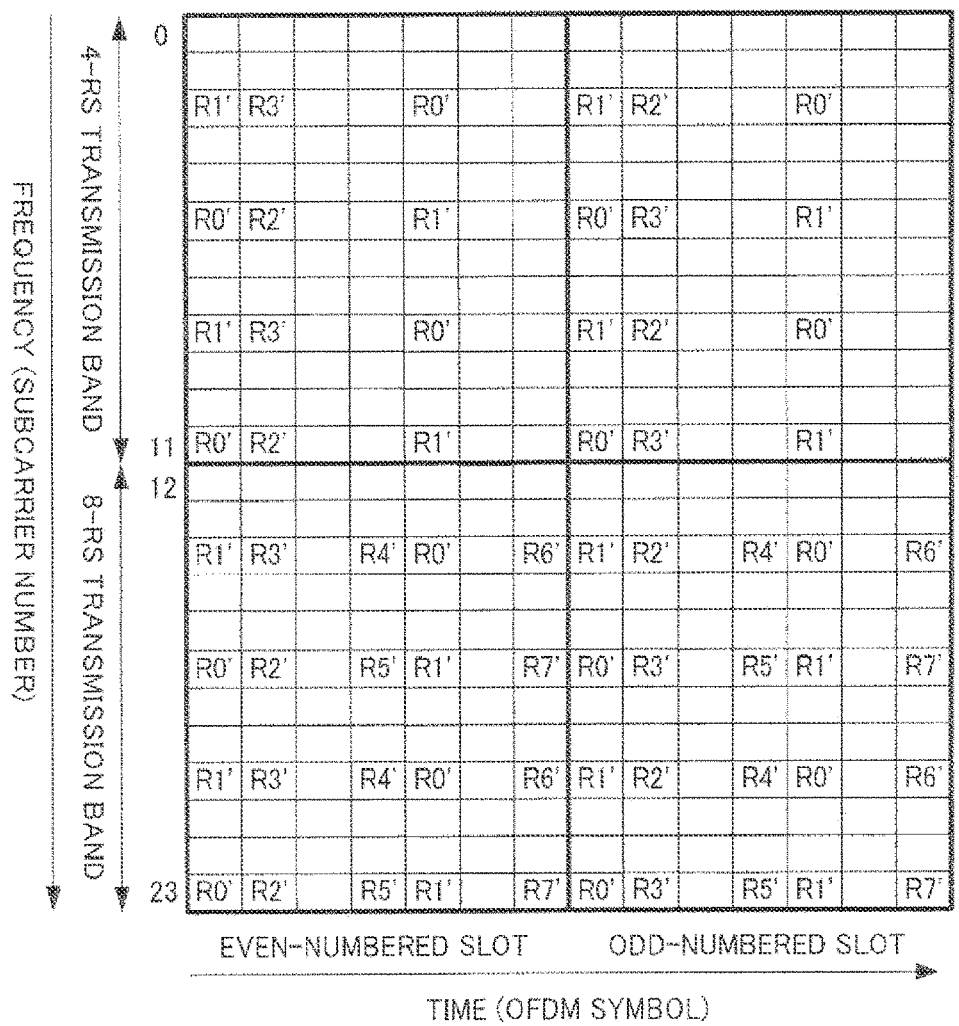
FIG. 14 illustrates an RS arrangement according to Embodiment 3 of the present invention.

Next, FIG. 14 illustrates an arrangement of RSs according to the present embodiment. R0' in FIG. 14 indicates resources whereby R0 is transmitted from antenna port 0 and antenna port 1, R1' indicates resources whereby R1 is transmitted from antenna port 2 and antenna port 3, R2' indicates resources whereby R2 is transmitted from antenna port 4 and antenna port 5 and R3' indicates resources whereby R3 is transmitted from antenna port 6 and antenna port 7. Furthermore, R4' indicates resources whereby R4 is transmitted from antenna port 0 and whereby on the other hand an RS with an inverted sign of R4 is transmitted from antenna port 1, R5' indicates resources whereby R5 is transmitted from antenna port 2 and whereby on the other hand an RS with an inverted sign of R5 is transmitted from antenna port 3, R6' indicates resources whereby R6 is transmitted from antenna port 4 and whereby on the other hand an RS with an inverted sign of R6 is transmitted from antenna port 5, and R7' indicates resources whereby R7 is transmitted from antenna port 6 and whereby on the other hand an RS with an inverted sign of R7 is transmitted from antenna port 7.

Furthermore, as shown in FIG. 14, base station 300 divides the entire frequency band (subcarrier numbers 0 to 23) into a transmission band (subcarrier numbers 0 to 11, hereinafter referred to as the "4-RS transmission band") where data signals directed to LTE terminals supporting only 4-Tx base stations (or terminals that receive downlink data signals in the 4-RS transmission band out of LTE+ terminals) are arranged and a transmission band (subcarrier numbers 12 to 23, hereinafter referred to as the "8-RS transmission band") where data signals directed to LTE+ terminals also supporting 8-Tx base stations are arranged. Base station 300 may also broadcast the result of division of the frequency band to the LTE+ terminals or indicate information showing that eight RSs are transmitted in the 8-RS transmission band only to terminals whose data signals are allocated to the 8-RS transmission band using a downlink control signal (e.g., PDCCH).

Figure 2A:
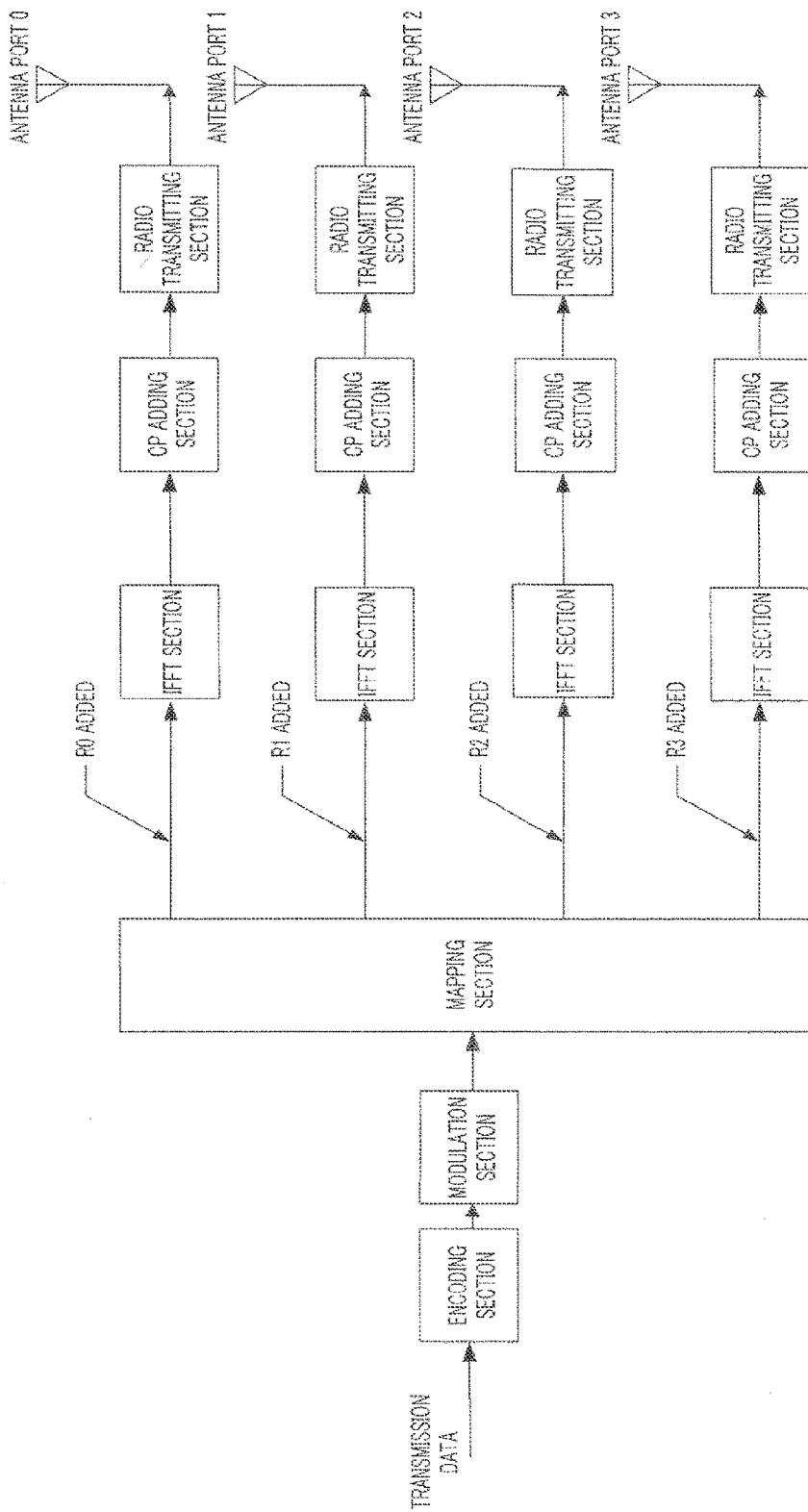
FIG. 2A is a block diagram illustrating a configuration of a conventional 4-Tx base station.
Figure 2B:
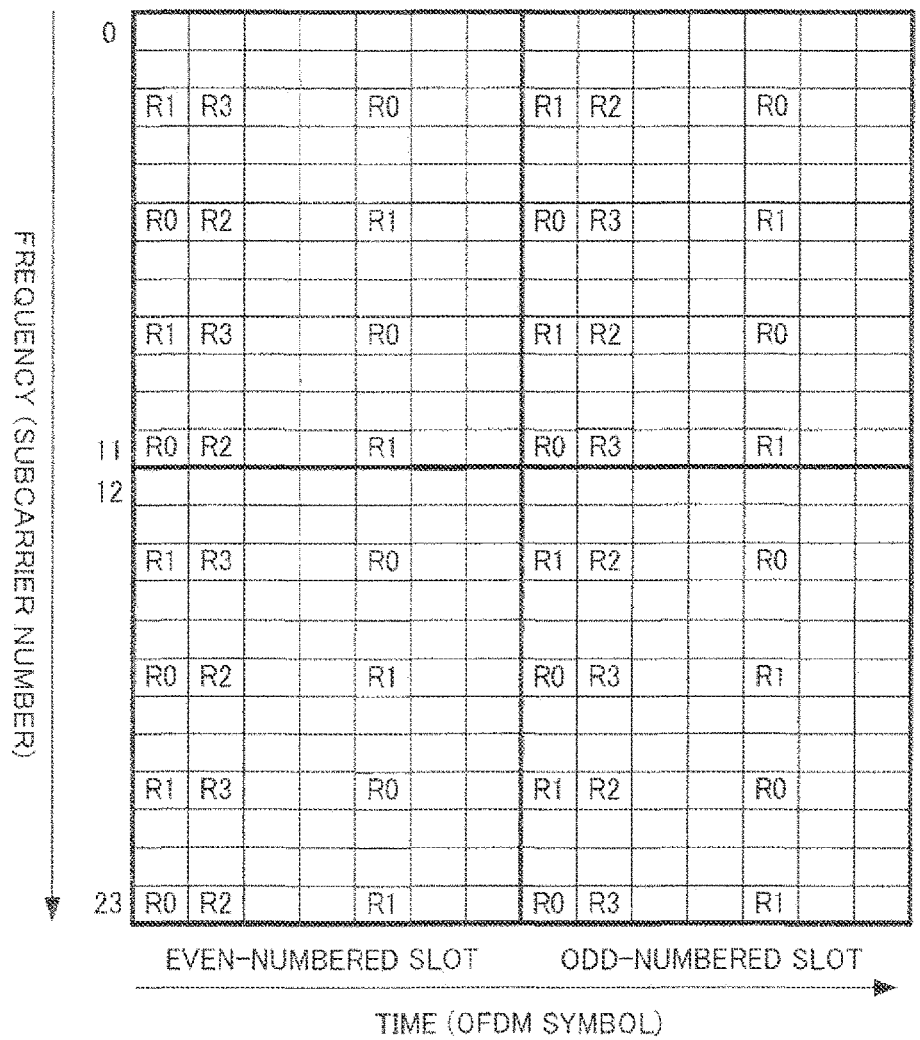
FIG. 2B illustrates an RS transmission method in the conventional 4-Tx base station.
Figure 3:
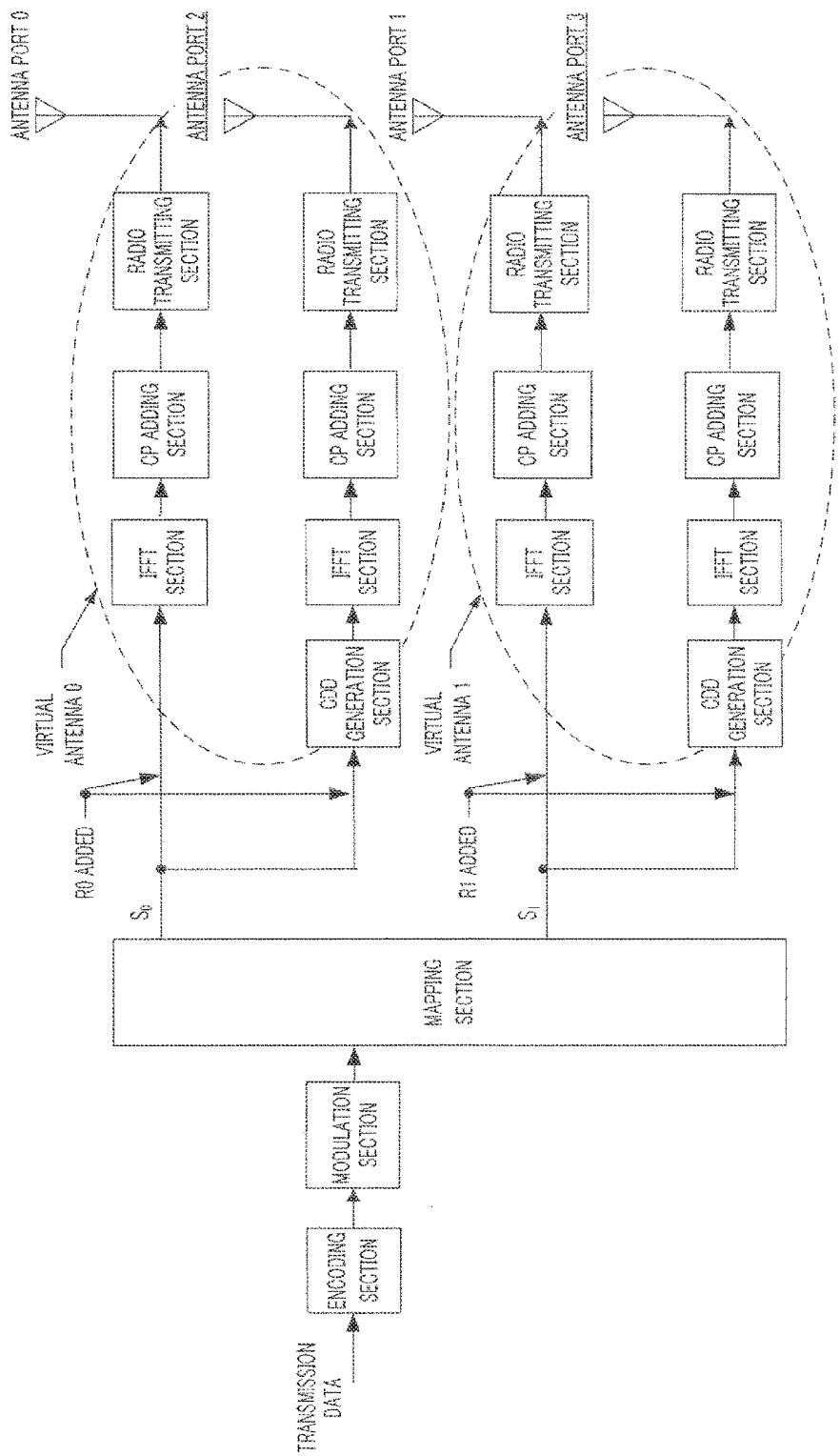
FIG. 3 is a block diagram illustrating a configuration of a conventional virtual 2-Tx base station.

R0' to R3' shown in FIG. 14 are transmitted using the same resources (the same timings and the same subcarriers) as those of R0 to R3 (FIG. 2B) from a 4-Tx base station according to 3GPP-LTE. Furthermore, R0' to R3' are arranged in all frequency bands (subcarrier numbers 0 to 23 shown in FIG. 14). Furthermore, R4 to R7 are further arranged in the 8-RS transmission band (subcarrier numbers 12 to 23) shown in FIG. 14 in addition to R0 to R3.

When base station 300 operates as a virtual 4-Tx base station, RSs from base station 300 are transmitted through R0' to R3' arranged in the 4-RS transmission band shown in FIG. 14. That is, overhead required for RS transmission during virtual transmission is equivalent to that of a 4-Tx base station. Furthermore, R0' shown in FIG. 14 is transmitted from antenna port 0 and antenna port 1 at the same time and using the same frequency, R1' is transmitted from antenna port 2 and antenna port 3 at the same time and using the same frequency, R2' is transmitted from antenna port 4 and antenna port 5 at the same time and using the same frequency and R3' is transmitted from antenna port 6 and antenna port 7 at the same time and using the same frequency. Therefore, since RSs can be transmitted using two radio transmitting sections per virtual antenna, the transmission power of RS and the transmission power of a data signal become twice these transmission powers at a 4-Tx base station. Therefore, the received quality at a terminal can be improved.

On the other hand, when base station 300 operates as an 8-Tx base station, RSs from base station 300 are transmitted through R0 to R3 arranged in the 8-RS transmission band shown in FIG. 14 and R4 to R7 arranged only in the 8-RS transmission band. However, as shown in FIG. 13, although R4' is transmitted from antenna port 0 and antenna port 1 at the same time and using the same frequency, the sign of R4 transmitted from antenna port 1 is inverted with respect to R4 transmitted from antenna port 0. The same applies to R5', R6' and R7'.

That is, in base station 300 shown in FIG. 13, this is equivalent to (1, 1) being assigned to R0, R1, R2 and R3 as a virtual antenna weight, and (1, −1), which is orthogonal to (1, 1) being assigned to R4, R5, R6 and R7, as a virtual antenna weight.

Next, transmission data will be described. In base station 300 shown in FIG. 12, transmission data transmitted in the 4-RS transmission band is mapped to four virtual antennas 0 to 3 by mapping section 303. The same virtual antenna weight as the virtual antenna weight assigned to R0, R1, R2 and R3 is applied to the transmission data mapped to each virtual antenna. On the other hand, in base station 300 shown in FIG. 13, transmission data transmitted in the 8-RS transmission band is directly mapped to eight antenna ports by mapping section 303. However, since transmission data transmitted in the 8-RS transmission band is mapped to the eight antenna ports in mapping section 303, no virtual antenna weight is applied.

Next, the operations of a terminal will be described.

For example, when an LTE terminal measures the downlink power (measurement) used in the case of handover or a new cell search, the LTE terminal uses R0' to R3'. That is, an LTE terminal measures the received power of R0' to R3' as the signal strength of virtual antennas 0 to 3. The LTE terminal then feeds back the measurement result to base station 300. Here, the LTE terminal needs not judge whether the RS used for measurement is the RS transmitted via the four antenna ports of the 4-Tx base station or the RS transmitted by the 8-Tx base station using virtual antennas. That is, an LTE terminal can measure downlink power without distinguishing between a 4-Tx base station and an 8-Tx base station. Furthermore, since R0' to R3' used for measurement are transmitted using virtual antennas, formed with two antenna ports each, in base station 300, the density (total power) of RSs increases in the LTE terminal, so that it is possible to perform accurate measurement.

Furthermore, when an LTE terminal (or a terminal out of LTE+ terminals that receives a downlink data signal in the 4-RS transmission band) receives a downlink data signal in the 4-RS band shown in FIG. 14, the LTE terminal performs channel estimation per antenna port using R0' to R3'. The LTE terminal then receives data signals transmitted from base station 300 using four channel estimate values and an antenna port mapping pattern for 4 antenna ports indicated beforehand from base station 300. Here, since base station 300 assigns weights of the virtual antennas to virtual antennas 0 to 3, the LTE terminal can receive downlink data signals without taking into account the fact that the number of antenna ports in base station 300 is eight.

Furthermore, when an LTE+ terminal receives a downlink data signal in the 8-RS transmission band shown in FIG. 14, the LTE+ terminal separates the signals from antenna ports 0 to 7 using the following calculations and performs channel estimation per antenna port.

Signal from antenna port 0=(received signal in R0'+ received signal in R4')/2

Signal from antenna port 1=(received signal in R0'− received signal in R4')/2

Signal from antenna port 2=(received signal in R1'+ received signal in R5')/2

Signal from antenna port 3=(received signal in R1'− received signal in R5')/2

Signal from antenna port 4=(received signal in R2'+ received signal in R6')/2

Signal from antenna port 5=(received signal in R2'− received signal in R6')/2

Signal from antenna port 6=(received signal in R3'+ received signal in R7')/2

Signal from antenna port 7=(received signal in R3'− received signal in R7')/2

Thus, an LTE+ terminal receives a downlink data signal transmitted from base station 300 using eight channel estimate values of antenna ports 0 to 7 and an antenna port mapping pattern for eight antenna ports.

Furthermore, the LTE+ terminal feeds back eight channel estimate values of antenna ports 0 to 7 to base station 300 over an uplink. Base station 300 determines an antenna port mapping pattern to be applied to downlink data directed to the LTE+ terminal for the next and subsequent transmissions based on feedback information.

Since the LTE terminal to which virtual antenna transmission is applied and the LTE+ terminal to which antenna port transmission is applied are multiplexed by OFDM, base station 300 switches between virtual antenna transmission (FIG. 12) and antenna port transmission (FIG. 13) for each terminal. That is, base station 300 has a switching section that switches between virtual antenna transmission (FIG. 12) and antenna port transmission (FIG. 13) for each terminal. Base station 300 then maps RSs and data signals in the configuration shown in FIG. 12 to the 4-RS transmission band shown in FIG. 14 for the LTE terminal to which virtual antenna transmission is applied, and carries out virtual antenna transmission. On the other hand, base station 300 maps RSs and data signals in the configuration shown in FIG. 13 to the 8-RS transmission band shown in FIG. 14 for the LTE+ terminal to which antenna port transmission is applied and carries out antenna port transmission.

The LTE terminal then performs channel estimation using the RSs transmitted through the virtual antennas on an as-is basis. On the other hand, the LTE+ terminal separates RSs transmitted through the antenna ports for each antenna port and performs channel estimation using the separated RSs.

With the present embodiment, the 8-Tx base station uses virtual antennas for the LTE terminal, and thereby carries out virtual antenna transmission using all the eight antenna ports. Therefore, the eight antenna ports can be used effectively. That is, the LTE terminal receives the same RS from two antenna ports forming a virtual antenna, so that it is possible to improve received quality. Furthermore, through transmission using virtual antennas, the LTE terminal can perform measurement in the case of handover or a new cell search without distinguishing the number of antenna ports in a base station.

Furthermore, with the present embodiment, an 8-Tx base station transmits data signals using eight antenna ports without using virtual antennas to the LTE+ terminal which is suitable for transmission of data signals using eight antenna ports. Here, the 8-Tx base station additionally arranges RSs only in the frequency band in which data to be transmitted to LTE+ terminals supporting reception of 8 RSs is arranged, so that it is possible to minimize the overhead of RSs. Furthermore, an LTE+ terminal can separate the received RSs into the RSs of the eight antenna ports. This allows an LTE terminal that desires virtual antenna transmission and an LTE+ terminal that desires antenna port transmission to be both present within a cell covered by a base station.

Base station 300 in FIG. 12 and FIG. 13 needs not be provided with a CDD generation section.

Embodiments of the present invention have been described so far.

A terminal may also be referred to as "UE," a base station apparatus may also be referred to as a "Node B" and a subcarrier may also be referred to as a "tone."

Furthermore, a CP may also be referred to as a "guard interval (GI)".

Furthermore, the method of transformation between the frequency domain and the time domain is not limited to the IFFT and FFT.

Furthermore, the present invention is applicable not only to base stations and terminals but is applicable to all radio communication apparatuses.

Also, although cases have been described with the above embodiments as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

INDUSTRIAL APPLICABILITY

The present invention is applicable to a mobile communication system or the like.

The invention claimed is:

1. A communication apparatus comprising:
    a receiver, which, in operation, receives first reference signals transmitted on a plural resource elements in a resource block, and receives second reference signals transmitted on a same one resource element in the resource block via a pair of antenna ports, the second reference signals having a polarity opposite to each other, and the first reference signals being associated with mobile stations of a first type and the second reference signals being associated with mobile stations of a second type; and
    circuitry, which, in operation, estimates one or more channel values using one or more of: the first reference signals and the second reference signals.

2. The communication apparatus according to claim 1 wherein the mobile stations of the first type support base station configurations of up to four antenna ports, and the mobile stations of the second type support base station configurations of up to eight antenna ports.

3. The communication apparatus according to claim 1 wherein the mobile stations of the first type are configured to support Long Term Evolution (LTE), and the mobile stations of the second type are configured to support LTE-Advanced.

4. The communication apparatus according to claim 1 wherein a phase of a first one of the second reference signals is reversed relative to a phase of a second one of the second reference signals.

5. The communication apparatus according to claim 1 wherein the second reference signals have a same magnitude.

6. The communication apparatus according to claim 1 wherein the first reference signals are used for both downlink channel quality estimation and downlink power measurement, and the second reference signals are used for downlink channel quality estimation.

7. The communication apparatus according to claim 1 wherein:
    the first reference signals are associated with the mobile stations of the first type and with the mobile stations of the second type; and
    the second reference signals are only associated with the mobile stations of the second type.

8. A communication apparatus comprising:
    a receiver, which, in operation, receives first reference signals transmitted on a plural resource elements in a resource block, and receives second reference signals transmitted on a same one resource element in the resource block via a pair of antenna ports, one of the second reference signals, which is multiplied by −1, being received, the first reference signals being associated with mobile stations of a first type and the second reference signals being associated with mobile stations of a second type; and
    circuitry, which, in operation, estimates one or more channel values using one or more of: the first reference signals and the second reference signals.

9. The communication apparatus according to claim 8 wherein the receiver, in operation, receives another of the second reference signals, the other of the second reference signals not being multiplied by −1 or being multiplied by 1.

10. The communication apparatus according to claim 8 wherein the receiver, in operation, receives a first one of the second reference signals, which is transmitted via a first one of the pair of antenna ports, and receives a second one of the second reference signals, which is transmitted via a second one of the pair of antenna ports, the first one of the second reference signals being multiplied by −1, and the second one of the second reference signals not being multiplied by −1 or being multiplied by 1.

11. The communication apparatus according to claim 8 wherein the mobile stations of the first type support base station configurations of up to four antenna ports, and the mobile stations of the second type support base station configurations of up to eight antenna ports.

12. The communication apparatus according to claim 8 wherein the mobile stations of the first type are configured to support Long Term Evolution (LTE), and the mobile stations of the second type are configured to support LTE-Advanced.

13. The communication apparatus according to claim 8 wherein the second reference signals have a same magnitude.

14. The communication apparatus according to claim 8 wherein the first reference signals are used for both downlink channel quality estimation and downlink power measurement, and the second reference signals are used for downlink channel quality estimation.

15. The communication apparatus according to claim 8 wherein:
    the first reference signals are associated with the mobile stations of the first type and with the mobile stations of the second type; and
    the second reference signals are only associated with the mobile stations of the second type.

16. A communication method comprising:
    receiving first reference signals transmitted on a plural resource elements in a resource block;
    receiving second reference signals transmitted on a same one resource element in the resource block via a pair of antenna ports, the second reference signals having a polarity opposite to each other, and the first reference signals being associated with mobile stations of a first type and the second reference signals being associated with mobile stations of a second type; and
    estimating one or more channel values using one or more of: the first reference signals and the second reference signals.

17. A communication method comprising:
    receiving first reference signals transmitted on a plural resource elements in a resource block;
    receiving second reference signals transmitted on a same one resource element in the resource block via a pair of antenna ports, the second reference signals having a polarity opposite to each other, and the first reference signals being associated with mobile stations of a first type and the second reference signals being associated with mobile stations of a second type; and
    estimating one or more channel values using one or more of: the first reference signals and the second reference signals.

* * * * *